(12) United States Patent
Hofer

(10) Patent No.: US 12,502,906 B2
(45) Date of Patent: Dec. 23, 2025

(54) OPTICALLY VARIABLE SECURITY ELEMENT, AND VALUE DOCUMENT CONTAINING THE OPTICALLY VARIABLE SECURITY ELEMENT

(71) Applicant: GIESECKE+DEVRIENT CURRENCY TECHNOLOGY GMBH, Munich (DE)

(72) Inventor: Moritz Hofer, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/555,131

(22) PCT Filed: Mar. 8, 2022

(86) PCT No.: PCT/EP2022/025085
§ 371 (c)(1),
(2) Date: Oct. 12, 2023

(87) PCT Pub. No.: WO2022/218568
PCT Pub. Date: Oct. 20, 2022

(65) Prior Publication Data
US 2024/0190159 A1 Jun. 13, 2024

(30) Foreign Application Priority Data
Apr. 13, 2021 (DE) .................... 10 2021 001 899.0

(51) Int. Cl.
*B42D 25/29* (2014.01)
*B42D 25/324* (2014.01)
(Continued)

(52) U.S. Cl.
CPC ............ *B42D 25/29* (2014.10); *B42D 25/324* (2014.10); *B42D 25/373* (2014.10); *B42D 25/425* (2014.10); *G02B 5/09* (2013.01)

(58) Field of Classification Search
CPC .... B42D 25/373; B42D 25/425; B42D 25/29; B42D 25/324; G02B 5/09
(Continued)

(56) References Cited

U.S. PATENT DOCUMENTS

| | | |
|---|---|---|
| 6,801,346 B2 | 10/2004 | Schilling et al. |
| 10,207,530 B2 | 2/2019 | Borgsmüller et al. |

(Continued)

FOREIGN PATENT DOCUMENTS

| | | |
|---|---|---|
| CN | 107206831 A | 9/2017 |
| CN | 109562636 A | 4/2019 |

(Continued)

OTHER PUBLICATIONS

German Search Report from corresponding DE Application No. 102021001899.0, Dec. 14, 2021.
(Continued)

*Primary Examiner* — Justin V Lewis
(74) *Attorney, Agent, or Firm* — Workman Nydegger

(57) ABSTRACT

An optically variable security element contains a motif region. An optically variable main motif has a contour that is visible to a viewer in the motif region at at least a first viewing angle, and the optically variable main motif includes substructures that are visible to the viewer. The visible substructures are visible along the contour of the main motif. The substructures are sub-motifs that are visible to the viewer, and each of the sub-motifs are provided with a contour.

20 Claims, 11 Drawing Sheets

(51) Int. Cl.
  *B42D 25/373* (2014.01)
  *B42D 25/425* (2014.01)
  *G02B 5/09* (2006.01)

(58) Field of Classification Search
  USPC ................................. 283/72, 74, 94, 98, 901
  See application file for complete search history.

(56) References Cited

U.S. PATENT DOCUMENTS

| | | | |
|---|---|---|---|
| 10,632,779 B2 | 4/2020 | Holmes | |
| 11,623,465 B2 | 4/2023 | Scherer et al. | |
| 2004/0130760 A1* | 7/2004 | Schilling | B42D 25/328 359/2 |
| 2009/0322071 A1* | 12/2009 | Dichtl | B42D 25/342 283/70 |
| 2018/0022143 A1* | 1/2018 | Borgsmüller | B42D 25/324 283/91 |
| 2018/0201044 A1 | 7/2018 | Holmes | |
| 2019/0170917 A1 | 6/2019 | Tashiro et al. | |
| 2024/0190160 A1 | 6/2024 | Hofer | |

FOREIGN PATENT DOCUMENTS

| | | |
|---|---|---|
| CN | 110337372 A | 10/2019 |
| CN | 112118965 A | 12/2020 |
| CN | 117120272 A | 11/2023 |
| DE | 10127979 C1 | 11/2002 |
| EP | 3498488 A1 | 6/2019 |
| WO | 2012084182 A2 | 6/2012 |
| WO | 2018024488 A1 | 2/2018 |
| WO | 2018184715 A1 | 10/2018 |
| WO | 2018197044 A1 | 11/2018 |
| WO | 2020244805 A1 | 12/2020 |

OTHER PUBLICATIONS

International Search Report from corresponding PCT Application No. PCT/EP2022/025085, Jun. 14, 2022.
Chinese Office Action from Corresponding Chinese Patent Application No. CN202280028238.8, Jun. 27, 2025.

* cited by examiner

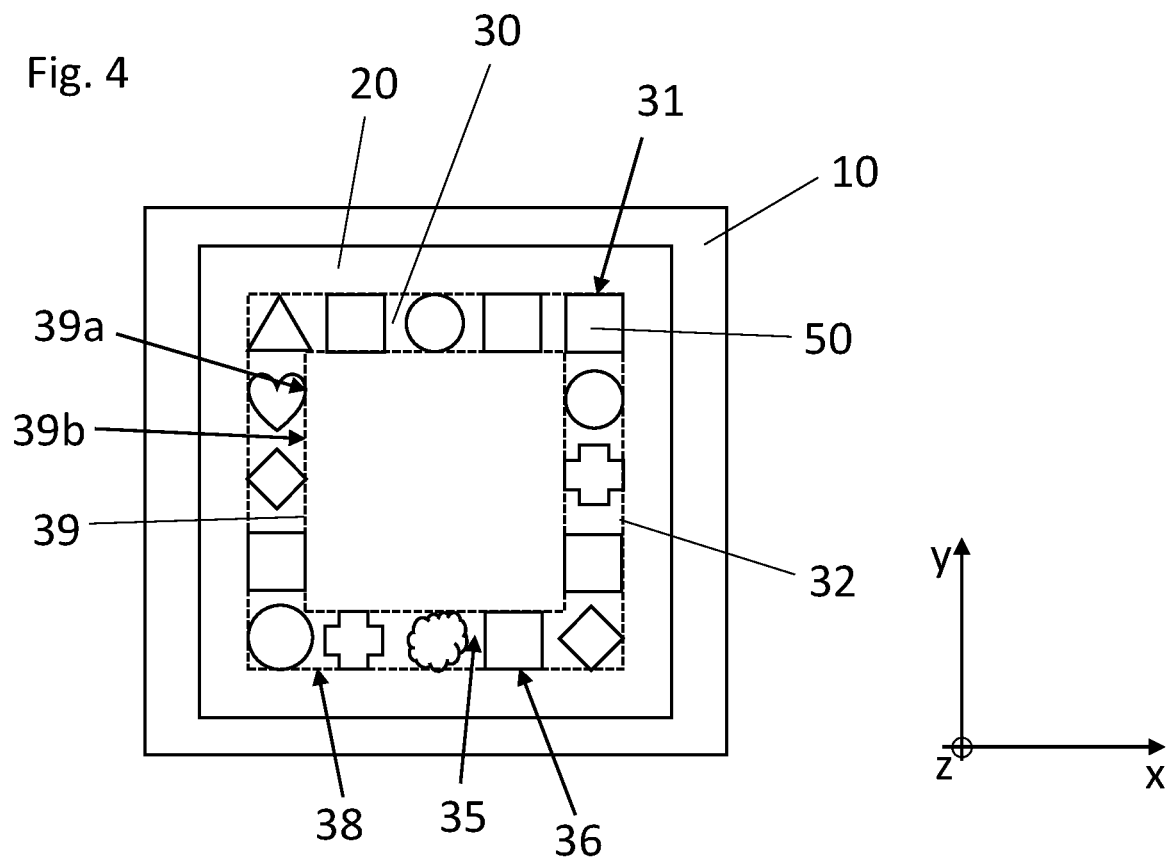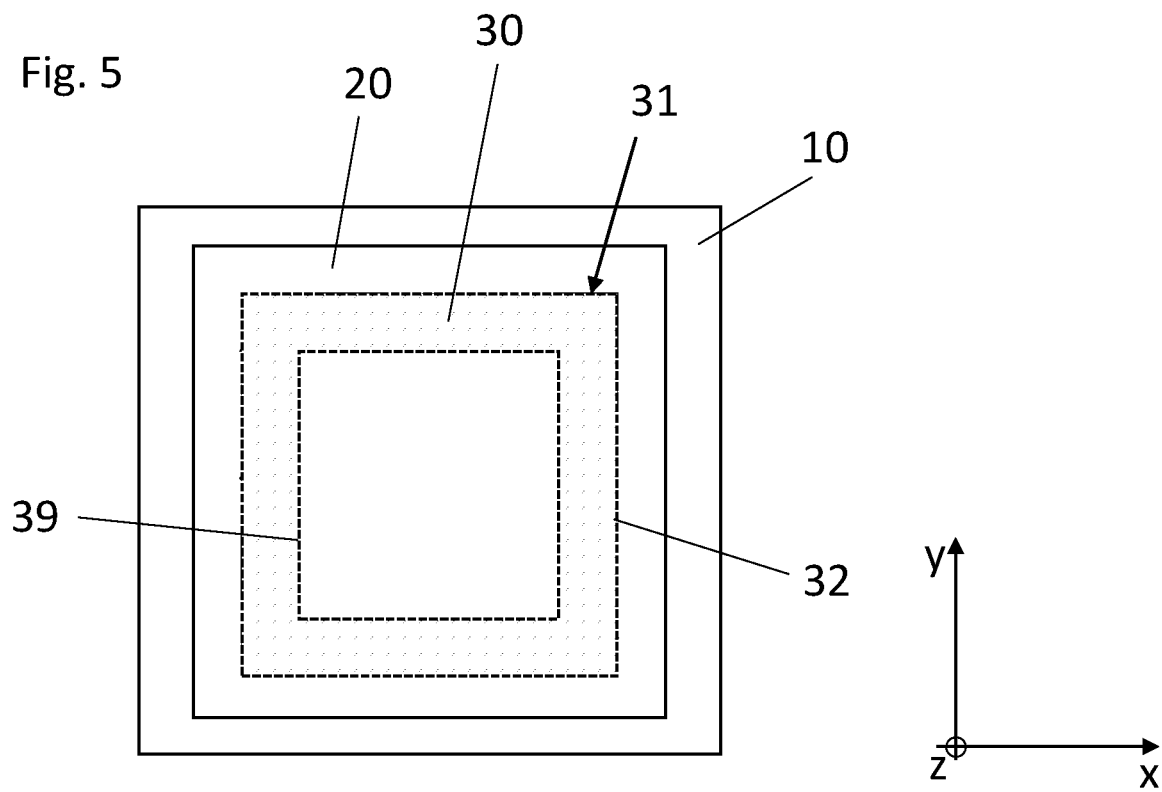

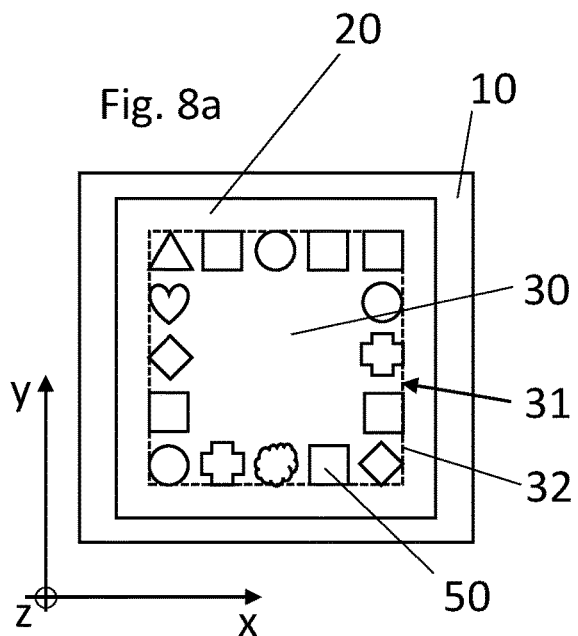
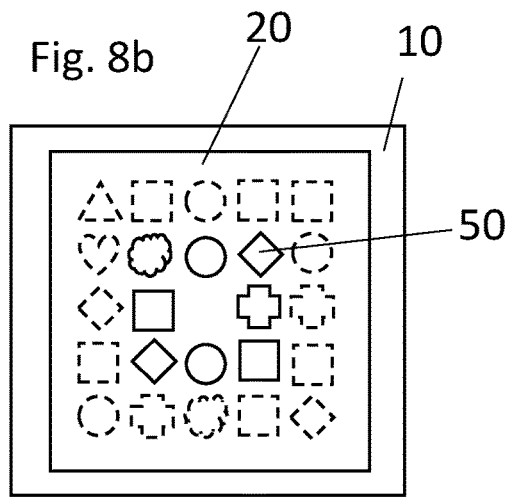
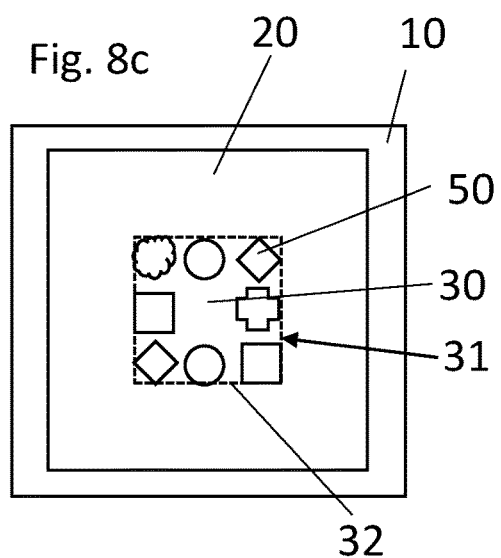
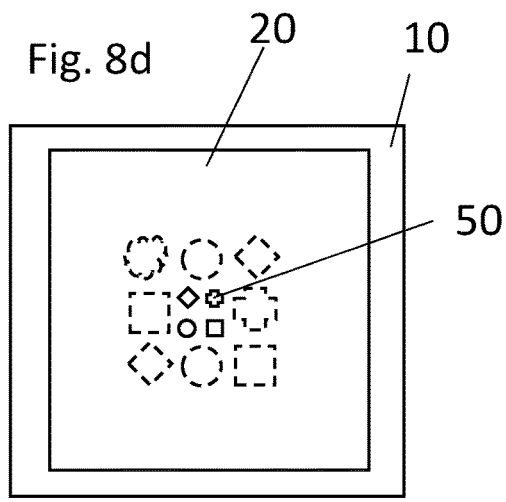
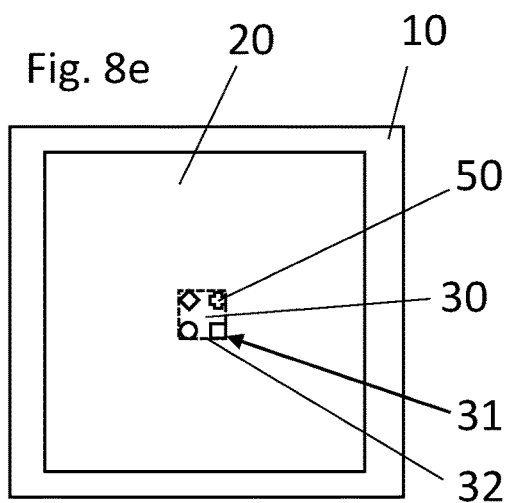

OPTICALLY VARIABLE SECURITY ELEMENT, AND VALUE DOCUMENT CONTAINING THE OPTICALLY VARIABLE SECURITY ELEMENT

TECHNICAL FIELD OF THE INVENTION

The invention relates to an optically variable security element having a motif visible to a viewer, which comprises visible substructures as submotifs. The invention furthermore relates to a document of value having the optically variable security element.

TECHNICAL BACKGROUND

Optically variable security elements, for example on banknotes, are known from the prior art. A viewer is in this case provided with different optical impressions as a function of a viewing angle. The different viewing angles may be achieved by tilting the optically variable element, or a document of value having the optically variable element, about an axis while the viewing direction of the viewer and the illumination direction of the optically variable element remain unchanged.

WO 2012/084182 A2 relates to an optically variable security element having a motif, the motif containing a plurality of substructures which extend over the motif, and which respectively have alternately bright and dark sections. In WO 2012/084182 A2, motifs are formed at a particular viewing angle by perceptible substructures which are not themselves motifs. The substructures allow a good contrast in a large solid angle and facilitate authenticity verification by a viewer or a user, and security against forgery of a document of value having the security element can be further improved.

SUMMARY OF THE INVENTION

It is an object of the invention to provide an optically variable security element which allows improved security against forgery and the authenticity of which can be verified easily by a viewer.

The object is achieved by the features described in the independent patent claims. Advantageous developments are specified in the dependent claims.

An optically variable security element comprises a motif region. An optically variable main motif having a main motif shape is visible to a viewer in the motif region at least at a first viewing angle. The optically variable main motif comprises substructures that are visible to the viewer, the visible substructures being visible along the contour of the main motif. The substructures are submotifs that are visible to the viewer. Each of the submotifs has a contour.

Security elements may be applied onto an object in order to allow verification of the authenticity of the object. Such an object may for example be a check, a bankcard, a document, a certificate, a proof of identity, an item of clothing (a label of an item of clothing) or a banknote.

Through the formation of the main motif by submotifs, the authenticity of a document of value having the security element may be ascertained particularly well and easily. On first view, for example, a geometrical motif, for example a square or a triangle, or another motif, for example an apple, may be identified by the viewer as a main motif. If the main motif is formed from submotifs, he or she may verify the authenticity of the document of value easily and reliably. Motifs can easily be perceived by a viewer and compared with other motifs, even if they have different sizes. For example, in the case of linear substructures of WO 2012/084182 A2 it is more difficult for the viewer to assess whether the perceived substructure corresponds to the structure envisioned by the manufacturer, so that authenticity verification by the viewer is only conditionally possible.

The security element can impart an optical impression to a viewer (a person) without aids, so that the viewer can visually perceive the authenticity of the object provided with the security element without aids. An optical security element is particularly suitable for simple or everyday authenticity verifications by a person. The optical impression may be perceptible in a wavelength range of from 400 nm to 780 nm.

In an optically variable security element, there are different optical impressions for the viewer who wishes to carry out an authenticity verification, as a function of the viewing angle, the viewing direction, the side of the security element or the way in which it is viewed (from the front or through the back). Thus, the security element may impart a first optical impression at a first viewing angle and a second optical impression at a second viewing angle, the first optical impression and the second optical impression being different.

The security element may be applied onto the object to be protected, for example a banknote or a precursor of a banknote, for example as a patch or as a strip. The security element may be formed over an area. The area of the security element may be at most 5000 mm$^2$, preferably at most 2500 mm$^2$, more preferably at most 1500 mm$^2$, more preferably at most 1000 mm$^2$.

The security element may have a length which is at least five times, preferably at least ten times, greater than its width. The security element may have a width of at least 1 mm.

The security element may be provided as a thread. The security element may be provided as a strip.

A security paper may be a precursor of a document of value. A security paper may be a paper which has not yet been fully printed. A security paper may comprise at least one security element, at least one window and/or at least one security feature.

The security element may be applied onto a document of value or a security paper. The security element may extend from one side of the document of value or security paper to another side of the document of value or security paper. The sides may be opposite sides. The security element may have a length which is equal to the width or height of the document of value or security paper.

The security element may be introduced at least partially into the document of value or security paper. The security element may be introduced into the document of value or security paper in such a way that some sections of the security element are visible to a viewer and other sections of the security element are not visible to the viewer. The security element may be introduced into the document of value or security paper in such a way that some sections of the security element are covered by the document of value or security paper and other sections of the security element are not covered by the document of value or security paper.

A motif is particularly suitable as an optical impression. The motif may in this case be for example a circle, a quadrilateral or an apple.

The motif may be a geometrical figure. In particular, the motif is a circle or a polygon. The polygon may be a triangle, a quadrilateral, in particular a rectangle, a rhombus or a square, or a hexagon.

The motif has a contour. The contour of the motif may be an outer contour. The motif may be (optically) delimited from its surroundings by the contour. The contour may enclose an inner section of the motif. The motif may be established by the contour.

The motif may be visible in a motif region of the security element. The motif region may have an area which is equal to the area of the security element. The area of the motif region may be at most 95%, preferably at most 90%, more preferably at most 75%, more preferably at most 50%, more preferably at most 30%, more preferably at most 20% of the area of the security element.

A main motif may be the motif with a greatest perceptible extent of motifs in the motif region.

For example, the security element may define an x-y plane having an x direction and a y direction. Compared with all the perceptible motifs, the main motif may have the greatest extent in one direction. Compared with all the perceptible motifs, the main motif may have the greatest extent in the x direction. Alternatively or in addition, compared with all the perceptible motifs, the main motif may have the greatest extent in the y direction. Compared with all the perceptible motifs, the main motif may have the greatest extent in the x direction and the y direction. Compared with all the perceptible motifs, the main motif may have the greatest area in the x-y plane.

The at least first viewing angle may lie in a first viewing angle range. The viewing angle range may comprise a range of at most 40°, preferably at most 30°, more preferably at most 20°, more preferably at most 10°.

The main motif is optically variable. There may therefore be different optical impressions of the main motif for the viewer as a function of the viewing angle. Alternatively or in addition, there may therefore be different optical impressions of the main motif for the viewer as a function of the viewing direction. Alternatively or in addition, there may therefore be different optical impressions of the main motif for the viewer as a function of the side of the security element. Alternatively or in addition, there may therefore be different optical impressions of the main motif for the viewer as a function of the type of viewing (from the front or through the back).

Visible substructures of the main motif may be visually perceptible individually to the viewer. A substructure may be visually perceptible individually when it is distinguishable from a further structure by human eyes.

The main motif may comprise at least two, preferably at least three, more preferably at least four, more preferably at least five, more preferably at least ten, more preferably at least fifteen, more preferably at least twenty substructures.

Each of the substructures may have a smaller perceptible extent in the motif region than the main motif.

Each of the substructures may have a smaller area than the main motif in an x-y plane. In particular, the area of each of the substructures may be at most 50%, preferably at most 25%, more preferably at most 15%, more preferably at most 10%, more preferably at most 7%, more preferably at most 5%, more preferably at most 3% of the area of the main motif.

In general, an area of a motif may be the area enclosed (included) by the contour of the motif, particularly in an x-y plane of the security element. The contour may be an outer contour.

In general, an area of a structure may be the area enclosed (included) by the contour of the structure, particularly in an x-y plane of the security element. The contour may be an outer contour.

In general, a motif may have a brightly perceptible contour. An inner section of the motif which is enclosed by the contour may be darkly perceptible.

The main motif may be represented only by its contour, and/or the submotifs may respectively be represented only by their contour.

A brightly perceptible section exhibits a higher relative reflected light intensity than a darkly perceptible section at the given viewing angle under nondiffuse illumination, for example by the sun or a point light source.

The relative reflected light intensity is a ratio of reflected light intensity to incident light intensity. If the light of a light source is fully reflected, the relative reflected light intensity is 100%.

In a brightly perceptible section, the relative reflected light intensity may be at least 5%, preferably at least 10%, more preferably at least 20%, more preferably at least 30%, more preferably at least 40%, more preferably at least 50% greater than the relative reflected light intensity in a darkly perceptible section. The percentages indicated may be percentage points.

The substructures of the main motif are submotifs having a contour. Because a main motif that comprises perceptible (visible) submotifs is perceptible in the motif region of the security element, the authenticity of the security element may be verified particularly well by a viewer.

The contour of the main motif may enclose an inner section of the main motif.

The respective contour of each of the submotifs may enclose an inner section of each of the submotifs.

A contour of a submotif may enclose an inner section of the submotif. This may apply for each of the submotifs.

The main motif may have a main motif shape. Each of the submotifs may have a submotif shape.

The submotif shape of at least one of the submotifs may be different to the main motif shape of the main motif.

Each of the submotifs may have a submotif shape which may be different to the main motif shape of the main motif.

Each of the submotifs may have the same submotif shape.

At least two neighboring submotifs may have the same submotif shape.

At least two neighboring submotifs may have a different submotif shape.

At least one submotif shape of one of the submotifs may correspond to the main motif shape of the main motif.

It is possible for none of the submotifs to have a submotif shape which corresponds to the main motif shape of the main motif.

A first submotif may have a first submotif shape and a second submotif may have a second submotif shape, the first submotif shape and the second submotif shape having a different area. The first submotif shape may correspond to the second submotif shape.

At least 20%, preferably at least 40%, more preferably at least 60%, more preferably at least 80%, more preferably at least 90% of the submotifs may have an identical submotif shape. Each of the submotifs may have a submotif shape identical to every other submotif.

At least 20%, preferably at least 40%, more preferably at least 60%, more preferably at least 80%, more preferably at least 90% of the submotifs may have a different submotif shape. Each of the submotifs may have a submotif shape different to every other submotif.

At least 20%, preferably at least 40%, more preferably at least 60%, more preferably at least 80%, more preferably at least 90% of the submotifs may have a corresponding submotif shape. Each of the submotifs may have a submotif shape corresponding to every other submotif.

A first submotif may have a first submotif shape, a second submotif may have a second submotif shape and a third submotif may have a third submotif shape, the first submotif shape being different to the second submotif shape, the second submotif shape being different to the third submotif shape and the first submotif shape being different to the third submotif shape.

The submotifs may comprise at least five, preferably at least eight, more preferably at least ten, more preferably at least fifteen submotifs respectively having different submotif shapes. It is possible for none of the submotif shapes to be identical to another of the submotifs.

Motifs having identical motif shapes may be alignable. In particular, motifs having identical motif shapes may be alignable without modifying the motifs, for example without enlargement or without centric stretching.

Two motifs having different shapes cannot be alignable by enlargement or by centric stretching of one of the motifs.

For example, the main motif shape may be a square and one of the submotif shapes may be a circle. The submotif cannot be aligned with the main motif by enlargement or centric stretching.

During enlargement or centric stretching, all side ratios and angle ratios of a shape may be preserved.

In general, alignment of two motifs cannot take place if the areas of the motifs, for example the areas of the motifs which are enclosed by the respective contour of the motif, can be aligned to at most 80%, preferably to at most 85%, more preferably to at most 90%, more preferably to at most 92%, more preferably to at most 94%, more preferably to at most 96%, more preferably to at most 98%, more preferably to at most 99%, more preferably to at most 99.5%, more preferably to at most 99.8%, more preferably not fully.

Two motifs having corresponding shapes can be alignable by enlargement or by centric stretching of one of the motifs.

For example, the main motif shape and a submotif shape may respectively be a square. The side lengths of the square submotif may be less than the side lengths of the square main motif shape. The submotif may be aligned with the main motif by enlargement or centric stretching.

During enlargement or centric stretching, all side ratios and angle ratios of a shape may be preserved.

In general, alignment of two motifs may take place if the areas of the motifs, for example the areas of the motifs which are enclosed by the respective contour of the motif, can be aligned to at least 80%, preferably to at least 85%, more preferably to at least 90%, more preferably to at least 92%, more preferably to at least 94%, more preferably to at least 96%, more preferably to at least 98%, more preferably to at least 99%, more preferably to at least 99.5%, more preferably to at least 99.8%, more preferably fully.

The submotifs may comprise sub-submotifs, which are arranged along the contour of the respective submotif. The sub-submotifs may have a sub-submotif contour.

Each of the submotifs may comprise sub-submotifs, which are arranged along the contour of the respective submotif. The sub-submotifs may have a sub-submotif contour.

The sub-submotifs may have a sub-submotif shape. The sub-submotif shape of at least one of the sub-submotifs may be different to the main motif shape of the main motif. Alternatively or in addition, the sub-submotif shape of at least one of the sub-submotifs may be different to the submotif shape of at least one of the submotifs.

The sub-submotifs may have a sub-submotif shape. The sub-submotif shape of at least three of the sub-submotifs may be respectively different to the main motif shape of the main motif. Alternatively or in addition, the sub-submotif shape of at least three of the sub-submotifs may be respectively different to the submotif shape of at least one of the submotifs.

The sub-submotif shape of at least one of the sub-submotifs may correspond to the main motif shape of the main motif.

The sub-submotif shape of at least one of the sub-submotifs may correspond to the submotif shape of at least one of the submotifs.

The contour of the main motif may be an outer contour. The contour of a submotif may be an outer contour. The contour of a sub-submotif may be an outer contour.

The contour of the main motif may be visible to the viewer by alternately bright and dark sections. The contour of the main motif may likewise be visible to the viewer by a continuously bright section.

The bright sections of the contour of the main motif or the bright section of the contour of the main motif may be bright sections of the submotifs.

Along the contour, the alternately bright and dark sections may have a different extent. For example, a bright section may have a greater longitudinal extent than a subsequent dark section. A dark section may also have a greater longitudinal extent than a subsequent bright section.

Along the contour, the alternately bright and dark sections may have an identical extent. For example, a bright section may have an identical longitudinal extent to a subsequent dark section.

Along the contour, the extents of alternately bright and dark sections may be periodic. For example, a first bright section may have a first longitudinal extent, a subsequent first dark section may have a second longitudinal extent, a subsequent second bright section may have a third longitudinal extent and a subsequent second dark section may have a fourth longitudinal extent. The first longitudinal extent of the first bright section may be identical to the third longitudinal extent of the second bright section. The second longitudinal extent of the first dark section may be identical to the fourth longitudinal extent of the second dark section. The first longitudinal extent of the first bright section may be different to the second longitudinal extent of the first dark section. The first longitudinal extent of the first bright section may be different to the fourth longitudinal extent of the second dark section. The third longitudinal extent of the second bright section may be different to the second longitudinal extent of the first dark section. The third longitudinal extent of the second bright section may be different to the fourth longitudinal extent of the second dark section.

There may be a gap between the submotifs along the contour of the main motif. The submotifs along the contour may be spaced apart from one another or not touch one another. The submotifs may touch one another along the contour of the main motif. It is possible for there to be no gap between the submotifs along the contour of the main motif.

A longitudinal extent of a gap may be the shortest spacing between two submotifs in a direction, particularly in the x direction or in the y direction.

The contour of the main motif may be formed at least in sections, preferably fully, by the submotifs. The contour of the main motif may be formed in sections by the submotifs.

Sections of the submotifs may form the contour of the main motif. Preferably, the sections of the submotifs which have the greatest separation from an inner section of the main motif form the contour of the main motif.

The contour of the main motif may be formed in such a way that the contour includes the greatest possible area and is formed from sections of the submotifs. Between submotifs, the profile of the submotif sections from which the contour is formed may be continued rectilinearly or with the same curvature.

The submotifs may form at least 10%, preferably at least 20%, more preferably at least 30%, more preferably at least 40%, more preferably at least 50%, more preferably at least 60%, more preferably at least 70% of the total length of the contour of the main motif.

A spacing may respectively be visible between two neighboring submotifs.

The spacings between the submotifs may form less than 70%, preferably less than 60%, more preferably less than 50%, more preferably less than 40%, more preferably less than 30%, more preferably less than 20% of the total length of the contour of the main motif.

At least at one second viewing angle, the optically variable main motif may be visible with a smaller area than at the first viewing angle. The first viewing angle and the second viewing angle may be different viewing angles.

A transition from the first viewing angle to the second viewing angle may be performable by tilting the security element about an axis which lies in a plane defined by the security element.

The area of the main motif may be an area enclosed or surrounded by the main contour.

When the viewing angle changes, the main motif preferably exhibits a motion effect.

In a motion effect, the main motif may in particular change its size, change its shape, change its position and/or rotate as a function of the viewing angle.

Preferably, the main motif changes its shape when the viewing angle changes in a viewing angle range.

A viewing angle range may be at most 40°, preferably at most 30°, more preferably at most 20°, more preferably at most 10°. The first viewing angle and the second viewing angle may lie in the viewing angle range.

The motion effect may act continuously.

By the tilting of the security element, particularly in the viewing angle range, a motion effect may be perceptible to the viewer. The motion effect may act continuously.

By continuous tilting of the security element, particularly in the viewing angle range, the area of the optically variable main motif may be perceptible as decreasing continuously.

At the second viewing angle, the main motif may comprise visible submotifs. In general, the main motif may comprise visible submotifs at further viewing angles which are different to one another.

The area of each of the submotifs at the second viewing angle may be equal to the area of each of the submotifs at the first viewing angle. The area of each of the submotifs at a further viewing angle may be equal to the area of each of the submotifs at a preceding viewing angle. At least three, preferably at least four, more preferably at least five submotifs may in this case be visible at the first and/or second viewing angle.

The area of each of the submotifs at the second viewing angle may be less than the area of each of the submotifs at the first viewing angle. The area of each of the submotifs at a further viewing angle may be less than the area of each of the submotifs at a preceding viewing angle. At least three, preferably at least four, more preferably at least five submotifs may in this case be visible at the first and/or second viewing angle.

At the first and/or second viewing angle, a number of submotifs are visible in order to represent the main motif. The number of submotifs of the main motif may be at most 30, preferably at most 24, more preferably at most 16. Preferably, between 3 and 30 submotifs, preferably between 3 and 24 submotifs, more preferably between 3 and 16 submotifs may be visible at the first and/or second viewing angle. This number takes into account the fact that there may be more than one main motif or a multiplicity of main motifs on a security element.

The area of a submotif may be established by a contour of the submotif. The contour of the submotif may enclose or include the area.

The contour of the submotif may in principle be formed in a similar way to the contour of the main motif. For this purpose, a submotif may take the place of the main motif and sub-submotifs may take the place of submotifs.

The number of submotifs at the second viewing angle may be equal to the number of submotifs at the first viewing angle. The number of each of the submotifs at a further viewing angle may be equal to the number of each of the submotifs at a preceding viewing angle. At least three, preferably at least four, more preferably at least five, more preferably at least ten different, in particular second, viewing angles may in this case be viewed.

The number of submotifs at the second viewing angle may be less than the number of submotifs at the first viewing angle. The number of each of the submotifs at a further viewing angle may be less than the number of each of the submotifs at a preceding viewing angle. At least three, preferably at least four, more preferably at least five, more preferably at least ten different, in particular second, viewing angles may in this case be viewed.

A size ratio between the main motif and each of the submotifs may be equal (constant) at different viewing angles. The size ratio may be integer or noninteger. The size ratio may be integer and greater than 1. The size ratio may be at least 3, preferably at least 4, more preferably at least 5, more preferably at least 6. Preferably, the size ratio lies in a range of from 3 to 10, preferably from 3 to 8, more preferably from 4 to 6.

The size ratio may be $4.0\pm0.5$, $5.0\pm0.5$ or $6.0\pm0.5$, preferably $4.0\pm0.3$, $5.0\pm0.3$ or $6.0\pm0.3$, more preferably $4.0\pm0.2$, $5.0\pm0.2$ or $6.0\pm0.2$, more preferably $4.0\pm0.1$, $5.0\pm0.1$ or $6.0\pm0.1$.

A size ratio between the main motif and each of the submotifs may be variable (not constant) at different viewing angles. The size ratio may be established by $(n-i*c):1$. Here, n may be integer and/or i may be integer.

c indicates the viewing angle, with $c=0,1,2\ldots$ for the first, second, further second . . . of the viewing angles. For example, at a first viewing angle c is equal to 0, at a second viewing angle c is equal to 1, at a further second viewing angle c is equal to 2, etc. There may be a constant angle difference between the viewing angles viewed.

i may lie between 0.5 and 5.0, preferably between 0.5 and 4.0, more preferably between 0.5 and 3.5, more preferably between 0.5 and 2.5, more preferably between 0.5 and 1.5, more preferably between 0.7 and 1.3, more preferably between 0.9 and 1.1. Particularly preferably, i is equal to 1.

n may be at least 3, preferably at least 4, more preferably at least 5, more preferably at least 6. n may lie in a range of from 3 to 10, preferably from 3 to 8, more preferably from 4 to 6. n may be $4.0\pm0.5$, $5.0\pm0.5$ or $6.0\pm0.5$, preferably 4.0±0.3, 5.0±0.3 or 6.0±0.3, more preferably 4.0±0.2, 5.0±0.2 or 6.0±0.2, more preferably 4.0±0.1, 5.0±0.1 or 6.0±0.1.

In general, the size ratio may be determined by a ratio of a (maximum) extent of the main motif in one direction (for example the x direction or the y direction) in a plane defined by the security element to a (maximum) extent of a submotif in the same direction. The size ratio may be a ratio of the circumference of the main motif to the circumference of a submotif, in particular to each of the submotifs. The circumference may be determined by the respective contour.

The main motif shapes at different viewing angles may correspond to one another. The main motif may have a main motif shape at a first viewing angle and the main motif may have a main motif shape at a second viewing angle. The main motif shape at the first viewing angle may correspond to the main motif shape at the second viewing angle.

Each of the submotifs may comprise sub-submotifs. Each of the submotifs may comprise a contour. The contour may enclose an inner section of the respective submotif.

The sub-submotifs may be visible or identifiable after enlargement along the contour of the respective submotif.

The contour of the respective submotif may be formed by the sub-submotifs.

Each of the sub-submotifs may have a sub-submotif shape. The sub-submotif shape may correspond to the submotif shape. The sub-submotif shape may correspond to the main motif shape. The sub-submotif shape may be different to the submotif shape. The sub-submotif shape may be different to the main motif shape.

The security element may define an x-y plane. The x-y plane may comprise an x axis and a y axis. A transition from the first viewing angle to the second viewing angle may be performable by tilting the optically variable security element about the x axis. A transition from a third viewing angle, in particular each of the first, second or further second viewing angles, to a fourth viewing angle may be performable by tilting the optically variable security element about the y axis.

Preferably, the main motif will change during tilting about the x axis but will not change during tilting about the y axis. The viewing angle dependency of the submotifs is then selected for the y axis in such a way that the main motif represented by the submotifs is visible unchanged overall to the viewer (despite the change of the submotifs).

The submotif may have a size at the third viewing angle and the submotif may have a size at the fourth viewing angle, in which case the size of the submotif at the third viewing angle may be different to the size of the submotif at the fourth viewing angle. Preferably, the size of the submotif at the third viewing angle is greater than the size of the submotif at the fourth viewing angle.

The submotif may have a ratio of bright to dark sections at the third viewing angle and the submotif may have a ratio of bright to dark sections at the fourth viewing angle, in which case the ratio of bright to dark sections of the submotif at the third viewing angle may be different to a ratio of bright to dark sections of the submotif at the fourth viewing angle. Preferably, the ratio of bright to dark sections of the submotif at the third viewing angle is greater than the ratio of bright to dark sections of the submotif at the fourth viewing angle.

The submotif may have an area at the third viewing angle and the submotif may have an area at the fourth viewing angle. The area of the submotif at the third viewing angle may be the same size as the area of the submotif at the fourth viewing angle. Preferably, the submotif changes during tilting about the y axis, for example in size, location or degree of rotation, but its area remains unchanged. Preferably, submotifs change during tilting about the y axis without the total area of the submotifs changing. Since the area of the submotifs (that is to say the brightly shining sections) determines the brightness with which the main motif is visible, this variant is particularly advantageous.

By tilting about the y axis, a motion effect of a plurality of the submotifs may be visible to a viewer. By tilting about the y axis, a motion effect of the multiplicity of submotifs may be visible to a viewer. By tilting about the y axis, a motion effect of each of the submotifs may be visible to a viewer.

The motion effect of the submotifs may be identical to the motion effect of the main motif. The motion effect may be a size change, for example a pump effect, or an increase in the thickness of the contour of the respective submotif. Alternatively, submotifs may be visible as moving along the contour of the main motif within the motion effect.

In the case of a pump effect, the motif (submotif) may be visible alternately larger and smaller by tilting about an axis in one direction. In the case of a pump effect, a size decrease and/or size increase may be relatively small compared with other size changes.

In the case of tilting about the second axis, the change of the submotifs is preferably configured in such a way that the viewer sees an unchanged main motif.

The first viewing angle is different to the second viewing angle. The third viewing angle is different to the fourth viewing angle. The first, second, third and fourth viewing angles may be different viewing angles.

The optically variable security element may comprise an arrangement of directionally reflecting microreflectors. The microreflectors are preferably nondiffractive microreflectors. The microreflectors may be micromirrors. Preferably, the microreflectors are micromirrors respectively having an inclined surface.

The optically variable security element may comprise an arrangement of microreflectors which generate the main motif and the submotifs for the viewer as a function of the viewing angle. The microreflectors may be micromirrors.

The arrangement of microreflectors may comprise a relief structure having a reflection-increasing coating.

The arrangement of microreflectors may comprise a relief structure having a metal coating.

The arrangement of microreflectors may comprise a relief structure having a liquid-crystal coating.

The arrangement of microreflectors may comprise an embossed embossing lacquer layer.

A dimension of each of the microreflectors, in particular a maximum width of each of the microreflectors, may lie between 2 µm and 300 µm, preferably between 3 µm and 100 µm, more preferably between 5 µm and 50 µm.

The microreflectors, in particular the micromirrors, may be configured as described in DE 10 2005 061 749 A1. The microreflectors, in particular the micromirrors, may be generated or produced as described in DE 10 2005 061 749 A1.

The microreflectors may be inclined or tilted in relation to a plane (x-y plane) defined by the security element. In this way, the light of a light source may be reflected with a different strength toward a point by various microreflectors which are inclined differently in relation to the plane. By a suitable selection of the tilting of different microreflectors, a motif may be visible to a viewer by reflection of light. Different motifs may especially be visible to the viewer as a function of the viewing angle.

The microreflectors may be provided with a reflective or reflection-increasing coating. A metallic or high refractive index coating may be applied onto the microreflectors. A (color-tilting or color-filtering) multilayer system may be applied onto the microreflectors. The microreflectors may be provided with a liquid-crystal coating.

Microreflectors may for example be or have been formed by an embossing method in an embossable layer, for example in an embossing lacquer layer. The embossable layer may be or have been applied onto a substrate. The embossable layer may be a film, in particular a thermoplastic film. The embossable layer may be a radiation-curable lacquer. The embossable layer may have a plurality of sublayers.

The microreflectors may be overlaid with structures, the dimensions of which are preferably equal to or greater than one fourth of the wavelength of visible light. The structures may be referred to as subwavelength structures.

Subwavelength structures may be periodic structures, the period of which lies in the range of from 50 nm to 500 nm, preferably from 100 nm to 400 nm. Subwavelength structures may be aperiodic structures, the structure width of which lies in the range of from 50 nm to 500 nm, preferably from 100 nm to 400 nm. In this way, a motif may be represented in color, in particular multiple colors. The colors representation may be independently adjustable or selectable for each of the microreflectors. In particular, a color change may be achievable as a viewing angle-dependent color effect. A viewing angle-dependent color effect may be combined with a motion effect, in particular with a motion effect as described herein.

The submotifs may, in particular at the first viewing angle, have a maximum width of at most 5.0 mm. Preferably, the maximum width of the submotifs is at most 3.0 mm, more preferably at most 2.0 mm, more preferably at most 1.0 mm. The maximum width of the submotifs may be at least 100 µm, preferably at least 200 µm. The maximum width of the submotifs may lie between 100 µm and 5.0 mm, preferably between 100 µm and 2.0 mm, more preferably between 200 µm and 2 mm, even more preferably between 300 µm and 1.5 mm.

The submotifs may be optically variable submotifs. Alternatively or in addition, the sub-submotifs may be optically variable sub-submotifs.

A document of value may comprise each of the security elements disclosed herein. The document of value may be a check, a bankcard, a document, a certificate, a proof of identity, an item of clothing (a label of an item of clothing) or a banknote.

The document of value may comprise at least one further security element. The further security element may be a security element perceptible to a viewer. The further security element may be a security element not perceptible to a viewer. The further security element may be a security element perceptible to a machine.

The document of value may comprise at least one security feature. The security feature may be printed onto the document of value. The security feature may be incorporated into a substrate of the document of value. The security feature may be a security feature perceptible to a viewer. The security feature may be a security feature not perceptible to a viewer. The security feature may be a security feature perceptible to a machine.

BRIEF DESCRIPTION OF THE FIGURES

The invention, and further embodiments and advantages of the invention, will be explained in more detail below with the aid of figures, the figures merely describing exemplary embodiments of the invention. Components which are the same in the figures are provided with the same reference signs. The figures are not to be regarded as true to scale, and individual elements in the figures may be represented exaggeratedly large or exaggeratedly simplified.

FIG. 4 shows a security element 10 having a main motif 30;

FIG. 5 shows a security element 10 having a highlighted main motif 30;

FIG. 8a shows a security element 10 at a first viewing angle;

FIG. 8b shows the security element 10 in a transition from the first viewing angle to a second viewing angle;

FIG. 8c shows the security element 10 at the second viewing angle;

FIG. 8d shows the security element 10 in a transition from the second viewing angle to a further second viewing angle;

FIG. 8e shows the security element 10 at the further second viewing angle;

DETAILED DESCRIPTION OF EXEMPLARY EMBODIMENTS

Figure 1:
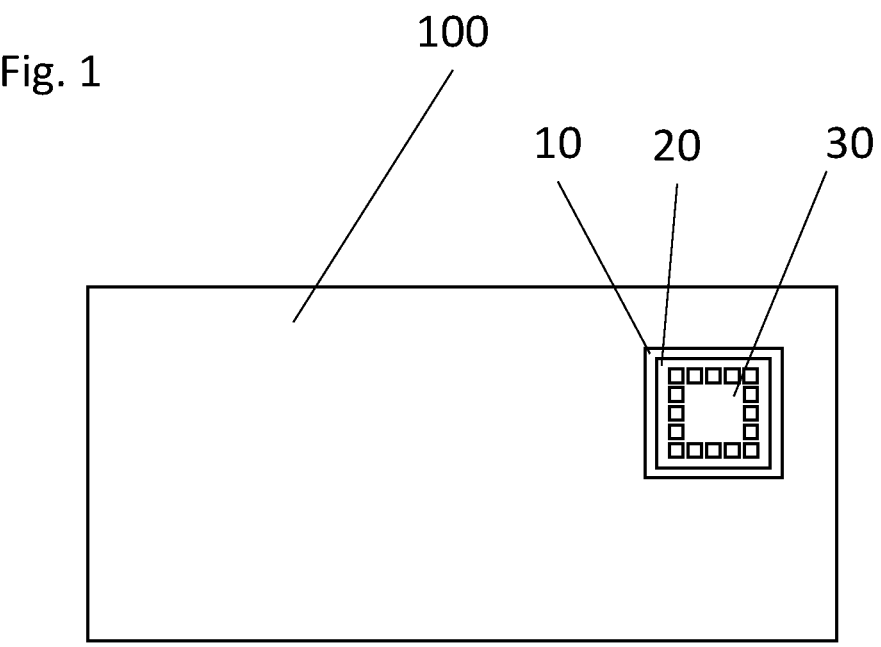
FIG. 1 shows a document of value 100 having a security element 10.

FIG. 1 shows a document of value 100 having a security element 10. The security element 10 comprises at least one motif region 20. In the motif region 20, (at least) one main motif 30 may be visible to a viewer.

The document of value 100 may for example be a banknote. A carrier or substrate of the document of value 100 may comprise or consist of one or more paper layers. The carrier or substrate of the document of value 100 may alternatively comprise or consist of one or more plastic layers. As a further alternative, the carrier or substrate of the document of value 100 may comprise at least one paper layer and at least one plastic layer.

The security element 10 may be applied onto the carrier (or substrate) of the document of value 100, for example as a security strip or security patch. In general, the security elements are provided on a transfer carrier, for example a plastic film, and then transferred from the transfer carrier (separated therefrom) onto the carrier of the document of value. Alternatively, the security element is introduced into the carrier of the document of value, for example as a security thread. The security element may in particular already be introduced into the carrier during the production of the carrier, for example even during the paper or film production or between two sublayers of the carrier.

Figure 2:
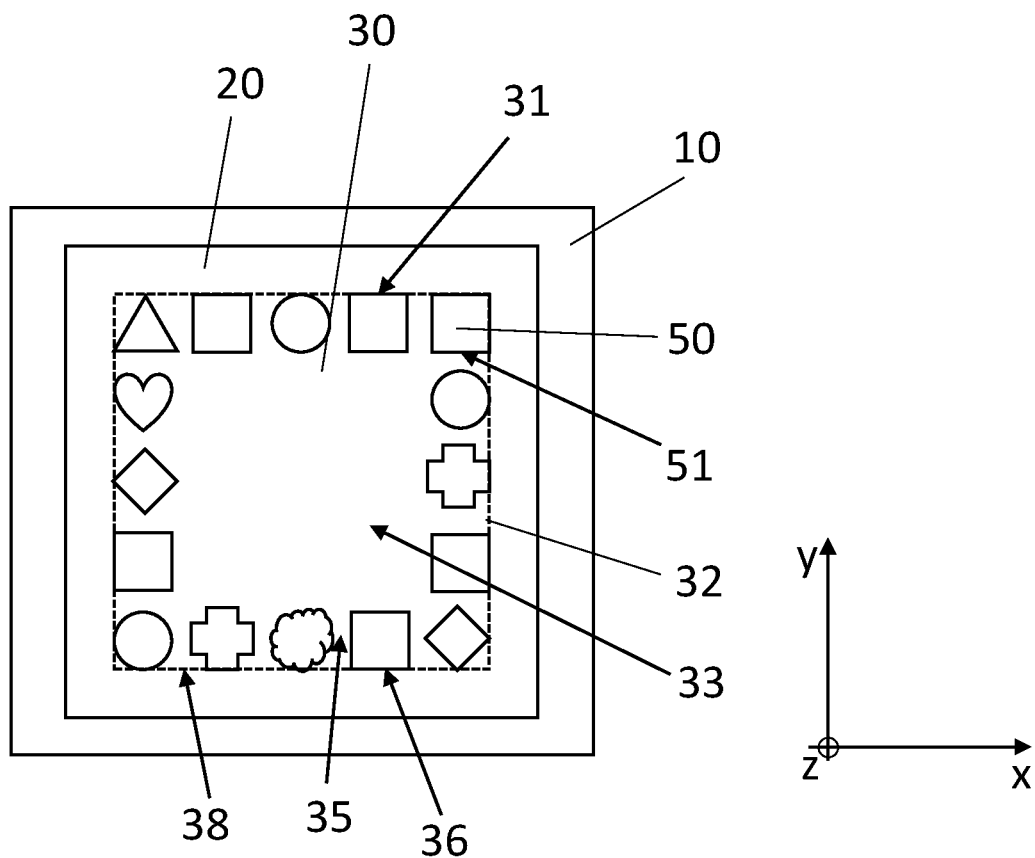
FIG. 2 shows a security element 10 having a main motif 30.

FIG. 2 shows a security element 10 having a motif region 20 at a first viewing angle.

An x-y plane may be defined by the security element 10, the x-y plane defining an x axis and a y axis. The x axis and the y axis may be oriented perpendicularly to one another. A z axis may be oriented perpendicularly to the x-y plane.

On the security element 10, particularly in the motif region 20, a main motif 30 having submotifs 50 is visible to a viewer. The main motif 30 having the submotifs 50 may, in particular, be visible at a first viewing angle.

In general, for technical reasons of representation, in the figures sections in the motif region 20 which appear bright to the viewer are represented as being black, and sections in the motif region 20 which appear dark to the viewer are represented as being white (bright).

Sections in the motif region 20 which appear bright or dark may be produced by micromirrors being arranged in the motif region 20. The surfaces of the micromirrors may be tilted in relation to the x-y plane, in such a way that they reflect light of the light source with a different strength to the viewer as a function of the viewing angle.

For example, micromirrors in a first section of the motif region 20 may be tilted in such a way that a relatively high proportion of light of the light source is reflected to the viewer at a viewing angle. Micromirrors in a second section of the motif region 20 may be tilted in such a way that a relatively low proportion of light, in particular no light, of the light source is reflected to the viewer at the viewing angle. The first section of the motif region 20 may act brightly, or be brightly perceptible to the viewer. The second section of the motif region 20 may act darkly, or be darkly perceptible to the viewer.

At another viewing angle, the first section of the motif region 20 may reflect a relatively low proportion of light of the light source to the viewer and the second section of the motif region 20 may reflect a relatively high proportion of light of the light source to the viewer.

The main motif 30 may have a main motif shape 31. The main motif shape 31 may, for example, be a geometrical figure. In the example of FIG. 2, the main motif shape 31 is a square.

The main motif 30 may have a contour 32. The contour 32 of the main motif 30 may (fully) include or enclose an area. The contour 32 of the main motif 30 may establish the main motif shape.

The contour 32 of the main motif 30 may include or enclose an inner section 33 of the main motif 30.

Submotifs 50 may be visible along the contour 32 of the main motif 30. The contour 32 of the main motif 30 may be formed by the submotifs 50.

The submotifs 50 may have a submotif shape 51. The submotif shape 51 may be different to the main motif shape 31.

Different submotifs 50 may respectively have a different submotif shape 51.

In the example of FIG. 2, the main motif shape 31 is a square. The submotifs along the contour 32 of the main motif 30 have different submotif shapes 51 (cf. also FIG. 12*b*). The area of each of the submotifs 50 may be less than the area of the main motif 30.

Along the contour 32 of the main motif 30, all submotifs 50 may have a submotif shape 51 which is different to the main motif shape 31.

The contour 32 of the main motif 30 may be perceptible as a continuous line. For example, the contour 32 of the main motif 30 may be a continuously brightly visible section of the main motif.

If the contour 32 of the main motif 30 is perceptible as a continuous line, the submotifs 50 may be arranged in such a way that no gap 35 is visible between the submotifs 50 (in the region of the contour 32).

The contour 32 of the main motif 30 may be perceptible to a viewer as an interrupted or discontinuous line. For example, the contour 32 of the main motif 30 may have alternately brightly perceptible sections 36 and darkly perceptible sections 38. In this case, a brightly perceptible section 36 may follow a darkly perceptible section 38, which is in turn followed by a brightly perceptible section 36, etc.

A brightly perceptible section 36 of the contour 32 of the main motif 30 may be established by a submotif 50. For example, one submotif 50 or each of the submotifs 50 may comprise a contour 52 (see FIG. 12*b*). A section of the contour 52 of a submotif 50 may be the brightly perceptible section 36 of the contour 32 of the main motif 30.

Brightly perceptible sections 36 of the contour 32 of the main motif 30 may be sections of contours 52 of the submotifs 50.

The submotifs 50 may be visible along the contour 32 of the main motif 30. The contour 32 of the main motif 30 may (fully) surround the submotifs 50.

The submotifs 50 may be (fully) visible in an inner section 33 of the main motif 30. The inner section 33 of the main motif 30 may be (fully) enclosed by the contour 32 of the main motif 30.

The submotifs 50 may be visible spaced apart from one another in the motif region 20. There may be a gap 35 between two neighboring submotifs 50.

The submotifs 50 may be visible spaced apart constantly from one another in the motif region 20. For all submotifs 50 in the motif region 20, an identical gap 35 may be visible between two neighboring submotifs 50.

A gap 35 between two submotifs 50 may cause a darkly perceptible section 38 of the contour 32 of the main motif 30. A darkly perceptible section 38 of the contour 32 of the main motif 30 may be an absence of a contour 52 of a submotif 50.

Brightly perceptible sections 36 and darkly perceptible sections 38 of the contour 32 of the main motif 30 may have a different longitudinal extent.

For example, brightly perceptible sections 36 may have a greater longitudinal extent than darkly perceptible sections 38.

Likewise, darkly perceptible sections 38 may have a greater longitudinal extent than brightly perceptible sections 36.

Brightly perceptible sections 36 and darkly perceptible sections 38 may have an identical longitudinal extent.

At least 10%, preferably at least 25%, more preferably at least 40%, more preferably at least 55%, more preferably at least 70%, more preferably at least 85%, more preferably at least 90% of the darkly perceptible sections 38 of the contour 32 of the main motif 30 may have the same longitudinal extent.

At least 10%, preferably at least 25%, more preferably at least 40%, more preferably at least 55%, more preferably at least 70%, more preferably at least 85%, more preferably at least 90% of the brightly perceptible sections 36 of the contour 32 of the main motif 30 may have the same longitudinal extent.

The contour 32 of the main motif 30 may be brightly perceptible to at least 10%, preferably to at least 25%, more preferably to at least 40%, more preferably to at least 55%, more preferably to at least 70%, more preferably to at least 85%, more preferably to at least 90% (of its total length).

The contour 32 of the main motif 30 may be darkly perceptible to at least 10%, preferably to at least 25%, more preferably to at least 40%, more preferably to at least 55%, more preferably to at least 70%, more preferably to at least 85%, more preferably to at least 90% (of its total length).

The inner section 33 of the main motif 30, which is enclosed by the contour 32, may be darkly perceptible to at least 25%, preferably to at least 50%, more preferably to at least 60%, more preferably to at least 70%, more preferably to at least 80%, more preferably to at least 90%.

Figure 3:
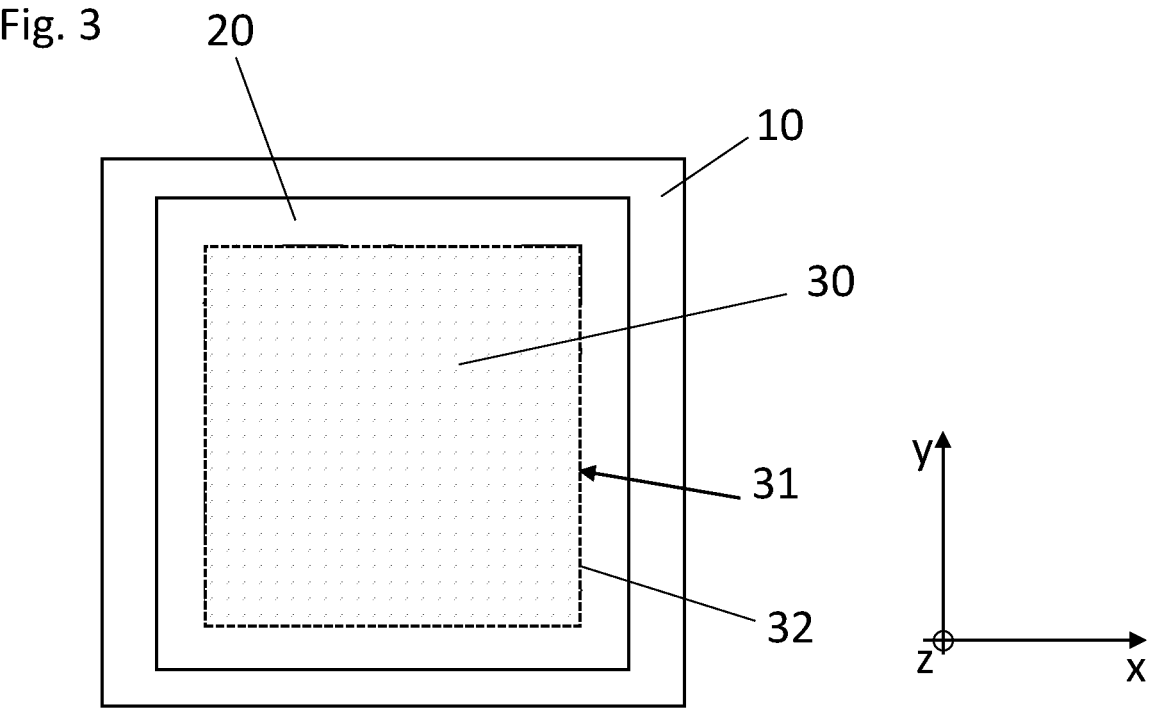
FIG. 3 shows a security element 10 having a highlighted main motif 30.

FIG. 3 shows a security element 10 having a motif region 20. The main motif 30 is indicated therein as a dotted area.

The main motif 30 may be fully delimited from the surroundings of the main motif 30 by the contour 32. In particular, the main motif 30 comprises a continuous area which is enclosed by the contour 32 of the main motif 30.

FIG. 4 shows a security element 10 having a motif region 20 at a first viewing angle. The security element 10 may be identical to the security element 10 described with reference to FIG. 1.

A main motif 30 is visible (perceptible) in the motif region 20. The main motif 30 may have a main motif shape 31.

The main motif 30 may have a contour 31 as the outer contour. The main motif 30 may have an inner contour 39.

The main motif 30 may comprise submotifs 50. The submotifs 50 may be visible between the inner contour 39 and the outer contour. The submotifs 50 may be visible along the inner contour 39. The submotifs 50 may be visible along the outer contour.

There may be a gap 35 between two neighboring submotifs 50. The arrangement of the submotifs 50 may be identical to the arrangement of the submotifs 50 as described with reference to FIG. 1.

The contour 32 as an outer contour may comprise brightly perceptible sections 36. The brightly perceptible sections 36 may be identical to the brightly perceptible sections 36 as described with reference to FIG. 1.

The contour 32 as an outer contour may comprise darkly perceptible sections 38. The darkly perceptible sections 38 may be identical to the darkly perceptible sections 38 as described with reference to FIG. 1.

The inner contour 39 of the main motif 30 may be perceptible as a continuous line. For example, the inner contour 39 of the main motif 30 may be a continuously brightly visible section of the main motif 30.

If the inner contour 39 of the main motif 30 is perceptible as a continuous line, the submotifs 50 may be arranged in such a way that no gap is visible between the submotifs 50 (in the region of the inner contour 39).

The inner contour 39 may comprise brightly perceptible sections 39a. The inner contour may comprise darkly perceptible sections 39b.

The inner contour 39 of the main motif 30 may be perceptible to a viewer as an interrupted or discontinuous line. For example, the inner contour 39 of the main motif 30 may have alternately brightly perceptible sections 39a and darkly perceptible sections 39b. In this case, a brightly perceptible section 39a may follow a darkly perceptible section 39b, which is in turn followed by a brightly perceptible section 39a, etc.

A brightly perceptible section 39a of the inner contour 39 of the main motif 30 may be established by a submotif 50. For example, one submotif 50 or each of the submotifs 50 may comprise a contour 52 (see FIG. 13b). A section of the contour 52 of a submotif 50 may be the brightly perceptible section 39a of the inner contour 39 of the main motif 30.

Brightly perceptible sections 39a of the inner contour 39 of the main motif 30 may be sections of contours 52 of the submotifs 50.

The submotifs 50 may be visible along the inner contour 39 of the main motif 30.

Brightly perceptible sections 39a and darkly perceptible sections 39b of the inner contour 39 of the main motif 30 may have a different longitudinal extent.

For example, brightly perceptible sections 39a may have a greater longitudinal extent than darkly perceptible sections 39b.

Likewise, darkly perceptible sections 39b may have a greater longitudinal extent than brightly perceptible sections 39a.

Brightly perceptible sections 39a and darkly perceptible sections 39b may have an identical longitudinal extent.

At least 10%, preferably at least 25%, more preferably at least 40%, more preferably at least 55%, more preferably at least 70%, more preferably at least 85%, more preferably at least 90% of the darkly perceptible sections 39b of the inner contour 39 of the main motif 30 may have the same longitudinal extent.

At least 10%, preferably at least 25%, more preferably at least 40%, more preferably at least 55%, more preferably at least 70%, more preferably at least 85%, more preferably at least 90% of the brightly perceptible sections 39a of the inner contour 39 of the main motif 30 may have the same longitudinal extent.

The inner contour 39 of the main motif 30 may be brightly perceptible to at least 10%, preferably to at least 25%, more preferably to at least 40%, more preferably to at least 55%, more preferably to at least 70%, more preferably to at least 85%, more preferably to at least 90% (of its total length).

The inner contour 39 of the main motif 30 may be darkly perceptible to at least 10%, preferably to at least 25%, more preferably to at least 40%, more preferably to at least 55%, more preferably to at least 70%, more preferably to at least 85%, more preferably to at least 90% (of its total length).

The main motif 30 may extend between the contour 32 as an outer contour and the inner contour 39. This is indicated in FIG. 5 by a dotted area.

The area between the inner and outer contours may be referred to as a main motif area.

The main motif 30 may have a frame-like shape.

Figure 6:
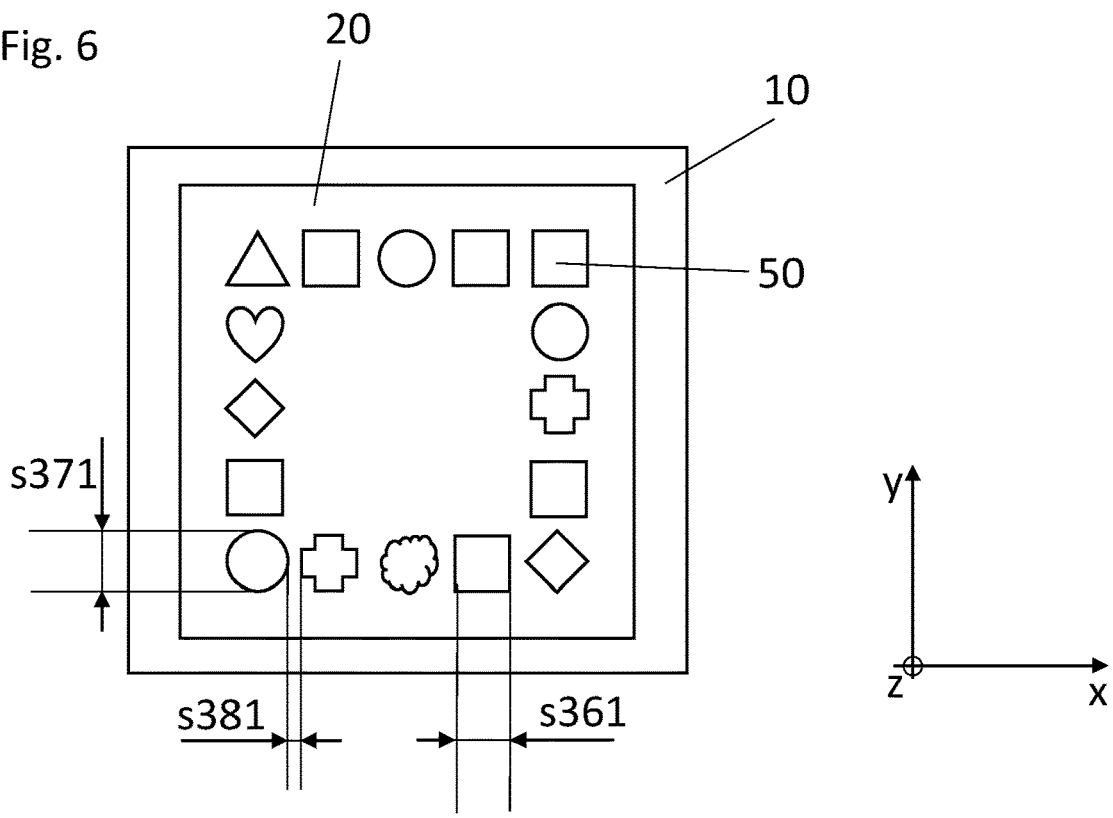
FIG. 6 shows a security element 10 having submotifs 50 and dimensions s361, s371 and s381.

FIG. 6 shows a security element 10 at a first viewing angle. The security element 10 comprises a motif region 20, in which submotifs 50 are visible. The security element 10 may be any security element 10 disclosed herein.

A submotif 50 may have a width s361. The width may be visible in the x direction (in the direction of the x axis). The width may be the maximum visible extent of the submotif 50 in the x direction.

The submotif 50 may have a height s371. The height may be visible in the y direction (in the direction of the y axis). The height may be the maximum visible extent of the submotif 50 in the y direction.

The width s361 and the height s371 may be equal. The width s361 and the height s371 may have the same longitudinal extent.

The width s361 and the height s371 may be different. The width s361 and the height s371 may have a different longitudinal extent.

The width s361 may be greater than the height s371. The width s361 may have a greater longitudinal extent than the height s371.

The width s361 may be less than the height s371. The width s361 may have a smaller longitudinal extent than the height s371.

The contour 32 may comprise a brightly perceptible section 36, the longitudinal extent of which is equal to the (longitudinal extent of the) width s361.

The contour 32 may comprise a brightly perceptible section 36, the longitudinal extent of which is equal to the (longitudinal extent of the) height s371.

There may be a spacing s381 between two neighboring submotifs 50. The spacing s381 may exist between each of the submotifs 50.

The spacing s381 between two neighboring submotifs 50 may be less than the width s361 and/or the height s371 of a submotif 50.

The spacing s381 between two neighboring submotifs 50 may be greater than the width s361 and/or the height s371 of a submotif 50.

The spacing s381 between two neighboring submotifs 50 may be equal to the width s361 and/or the height s371 of a submotif 50.

The spacing s381 between two neighboring submotifs 50 may be at most half as great as the width s361 and/or the height s371 of a submotif 50.

A fraction or all of the submotifs 50 of the main motif 30 may have the described height s371 and/or width s361.

Figure 7:
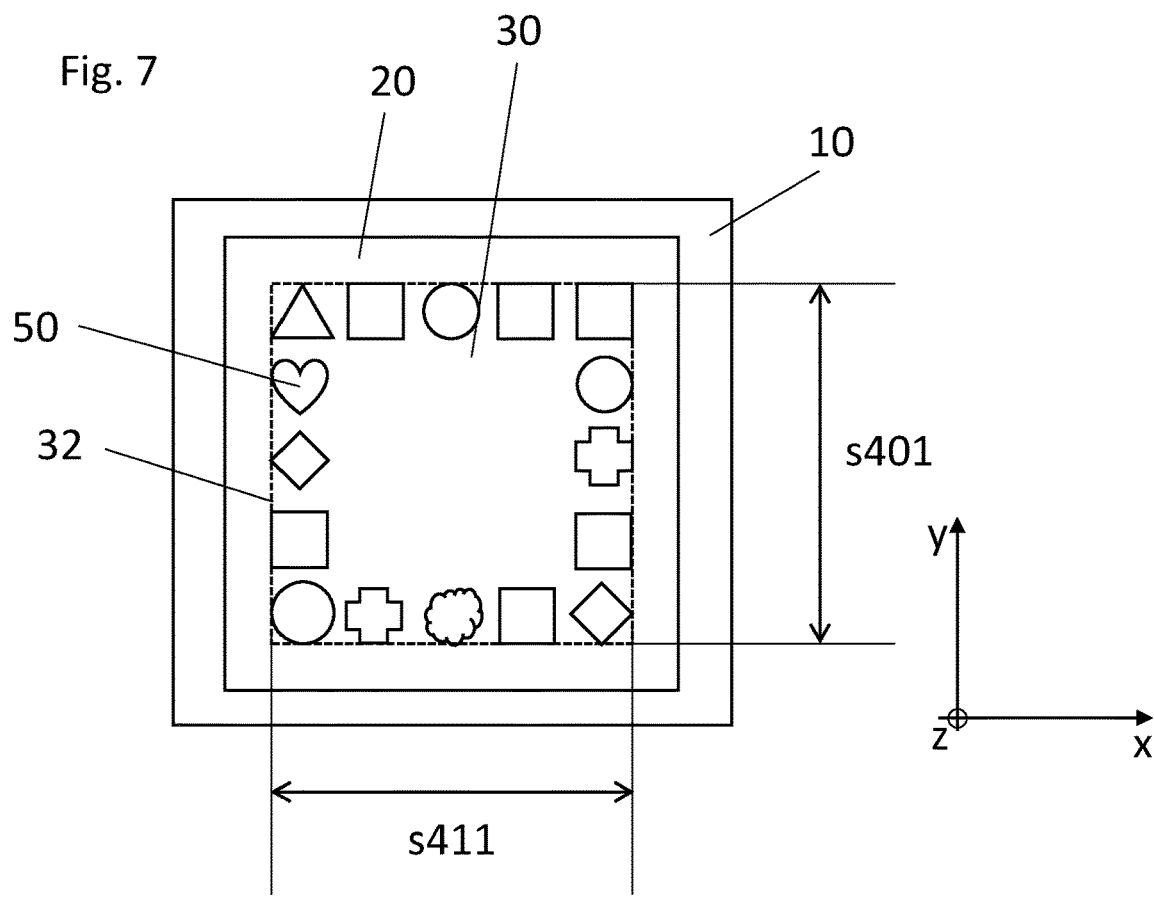
FIG. 7 shows a security element 10 having submotifs 50 and dimensions s401 and s411.

FIG. 7 shows a security element 10 at a first viewing angle. The security element 10 may be any security element 10 disclosed herein.

The main motif 30 may have a width s411. The width may be visible in the x direction (in the direction of the x axis). The width may be the maximum visible extent of the main motif 30 in the x direction. The main motif 30 may be delimited in the x direction by the contour 32 of the main motif 30.

The main motif 30 may have a height s401. The height may be visible in the y direction (in the direction of the y axis). The height may be the maximum visible extent of the main motif 30 in the y direction. The main motif 30 may be delimited in the y direction by the contour 32 of the main motif 30.

The width s411 and the height s401 may be equal. The width s411 and the height s371 may have the same longitudinal extent.

The width s411 and the height s401 may be different. The width s411 and the height s401 may have a different longitudinal extent.

The width s411 may be greater than the height s401. The width s411 may have a greater longitudinal extent than the height s401.

The width s411 may be less than the height s401. The width s411 may have a smaller longitudinal extent than the height s401.

A ratio between the width s411 and the height s401 of the main motif 30 may be substantially (±10%) equal to a ratio between the width s361 and the height s371 of the submotif or submotifs 50.

FIGS. 8a, 8c and 8e show a security element 10 at various viewing angles. The security element 10 is tilted along a first axis, which lies in the x-y plane, in particular along the x axis, in order to achieve the various viewing angles. The security element 10 may be any security element 10 disclosed herein.

The security element 10 may comprise a motif region 20. In the motif region 20, a main motif 30 having a main motif shape 31 may be visible to a viewer. The main motif 30 may comprise a contour 32. The main motif 30 may comprise submotifs 50.

FIG. 8a shows the security element 10 at the first viewing angle.

A main motif 30 may be visible in the motif region 20 of the security element 10. In this example, the main motif shape 31 is a square.

Some of the submotifs 50 have a submotif shape 51 which is different to the main motif shape 51.

A first fraction of the submotifs 50 may have a submotif shape 51 which corresponds to the main motif shape 31, and a second fraction of the submotifs 50 may have a submotif shape 51 which is different to the main motif shape 51.

The first fraction of the submotifs 50 may be (numerically) greater than the second fraction of the submotifs.

Each of the submotifs 50 may have a submotif shape 51 which is different to the main motif shape 31.

The main motif 30 may be delimited from the surroundings of the main motif 30 by a contour 32.

The main motif 30 may comprise submotifs 50. The submotifs 50 may be visible along the contour 32.

The security element 10 may define an x-y plane having an x axis (x direction) and a y axis (y direction).

FIG. 8b shows the same security element 10 as in FIG. 8a. In FIG. 8b, a transition from the first viewing angle to a second viewing angle is indicated. The security element 10 at the second viewing angle is shown in FIG. 8c. At least the position of the submotifs 50 has changed at the second viewing angle.

A transition from the first viewing angle to a second viewing angle may be performed by tilting the security element 10 or a document of value 100 having the security element 10 about the x axis (north-south tilting). In this case, a position of a light source and of a viewer should not change.

At the second viewing angle, the submotifs 50 are, for example, arranged in such a way that the main motif 30 has become smaller. In particular, the submotifs 50 may be visible in a section of the motif region 20 which is enclosed by the contour 32 of the main motif at the first viewing angle.

This is indicated in FIG. 8b by submotifs 50 with a dashed contour. The submotifs 50 with a dashed contour show the submotifs 50 at the first viewing angle, and the submotifs 50 with a continuous contour show the submotifs at the second viewing angle. The inner contour of the main motif at the first viewing angle encloses the contour 32 of the main motif at the second viewing angle. Likewise, it may be established that the submotifs 50 of the two viewing angles do not overlap.

At the second viewing angle, the number of submotifs 50 may have changed. In FIG. 8b, for example, from five to three submotifs per direction. For example, the number of visible submotifs 50 at the further viewing angle may be less (or greater) than at the first viewing angle, particularly if the main motif 30 has become smaller (or larger, respectively). Alternatively or in addition, the size of the submotifs 50 may vary, submotifs 50 of equal size being represented in FIG. 8b.

FIG. 8c shows the main motif 30 as visible at the second viewing angle. The area of the main motif 30 may be less at the second viewing angle than at the first viewing angle. The area of the main motif 30 which is enclosed by the contour 32 may be less at the second viewing angle than at the first viewing angle.

The main motif shape 31 of the main motif 30 at the second viewing angle may correspond to the main motif shape 31 of the main motif 30 at the first viewing angle.

In this example, the main motif shape 31 of the main motif 30 is respectively a square both at the first viewing angle and at the second viewing angle. Here, the squares have a different area. By enlarging the main motif 30 at the second viewing angle, it may be aligned with the main motif 30 at the first viewing angle.

FIG. 8d shows a transition of the main motif 30 from the second viewing angle to a further second viewing angle. In a similar way to the representation in FIGS. 8b and 8c, submotifs 50 with a dashed contour indicate submotifs 50 at the second viewing angle and submotifs 50 with a continuous contour indicate submotifs 50 at the further second viewing angle.

A transition from the second viewing angle to the further second viewing angle may be performed by further tilting the security element 10 or a document of value 100 having the security element 10 about the x axis (north-south tilting). In this case, a position of a light source and of a viewer should still not change.

At the further second viewing angle, the position of the submotifs 50 may have changed further. For example, the submotifs 50 may be visible in a section of the motif region 20 which is enclosed by the contour 32 of the main motif 30 at the second viewing angle. The main motif 30 has become even smaller during the further tilting.

At the further second viewing angle, the number of submotifs 50 may have changed (further). For example, the number of visible submotifs 50 at the further second viewing angle may be less (or greater) than at the second viewing angle, particularly if the main motif 30 has become smaller (or larger, respectively). Alternatively or in addition, the size of the submotifs 50 may vary, that is to say for example become smaller at the same time as shown.

In FIG. 8e, the main motif 30 at the further second viewing angle may be seen. The area of the main motif 30 may be less at the further second viewing angle than at the second viewing angle. The area of the main motif 30 which is enclosed by the contour 32 may be less at the further second viewing angle than at the second viewing angle.

The main motif shape 31 of the main motif 30 at the further second viewing angle may correspond to the main motif shape 31 of the main motif 30 at the second viewing angle.

In this example, the main motif shape 31 of the main motif 30 is respectively a square both at the second viewing angle and at the further second viewing angle. Here, the squares have a different area. By enlarging the main motif 30 at the further second viewing angle, it may be aligned with the main motif 30 at the second viewing angle.

FIGS. 8a to 8e represent a security element 10 which has two second viewing angles. There may also be more than two, in particular three or four, second viewing angles.

A movement of the main motif 30, in FIGS. 8a to 8e that is to say the size change of the main motif 30, may act continuously for the viewer during the tilting. The submotifs 50 may either be arranged statically or move during the tilting of the security element.

By means of statically arranged submotifs 50, a continuously appearing movement (in particular continuous size change) of the main motif may be achieved. In particular, during the tilting, the submotifs 50 of the following (second or further second) viewing angle may become increasingly visible in sections, while the submotifs 50 of the previous viewing angle correspondingly become invisible in sections in the opposite way. The main motif—as in FIGS. 8a, 8c and 8e—is initially represented by the fully visible, or shining, submotifs of a (first or second) viewing angle and is then represented by the fully visible, or shining, submotifs of the following (second or further second) viewing angle. In the transition between the aforementioned viewing angles, more and more partial sections of the submotifs of the second (or further second) viewing angle become visible (bright)—starting on the side of the submotifs of the first (or respectively second) viewing angle. Similarly—starting on the applied side of the submotifs of the second (or respectively further second) viewing angle—more and more partial sections of the submotifs of the first (or respectively second) viewing angle become invisible (dark). The main motif is therefore represented in motion by the static submotifs which are visible only in partial sections between the first and second viewing angles.

Alternatively, a continuously appearing movement (in particular continuous size change) of the main motif may also be achieved by means of moving submotifs. During the tilting of the security element, the main motif moves by at least a plurality of the submotifs moving, in particular from a position of the submotif at the first (or second) viewing angle to a position of the submotif at the second (or further second) viewing angle. Starting from FIG. 8a, eight of the sixteen visible submotifs 50, that is to say for example every second of the submotifs 50, move inward until they have reached their new position of FIG. 8c. The other eight submotifs disappear (become dark), preferably at the start of the movement. Starting from FIG. 8c, four of the eight submotifs 50, that is to say for example every second submotif again, move inward until they have reached their new position of FIG. 8e. The other four submotifs disappear, preferably at the start of the further movement.

For a continuous movement of the main motif, moving submotifs are advantageous since they are more difficult to replicate. The use of static submotifs, on the other hand, helps with brighter representation of the motifs and/or a second effect for another tilt axis.

It is conceivable, but does not lead to a continuous movement of the main motif, for the brightness of the submotifs respectively to change overall during the tilting to the (further) second viewing angle. If the submotifs were for example to change their overall brightness beyond a limit angle during the tilting (bright=>dark, dark=>bright), an abrupt position change of the main motif would be visible to the viewer. If the submotifs constantly change their overall brightness during the tilting, on the other hand, particularly the submotifs of the first (or second) viewing angle constantly from bright to dark and the submotifs of the second (or further second) viewing angle constantly from dark to bright, a main motif which is slowly blended in at its new position and slowly blended out at its old position would be visible to the viewer.

Figure 9A:
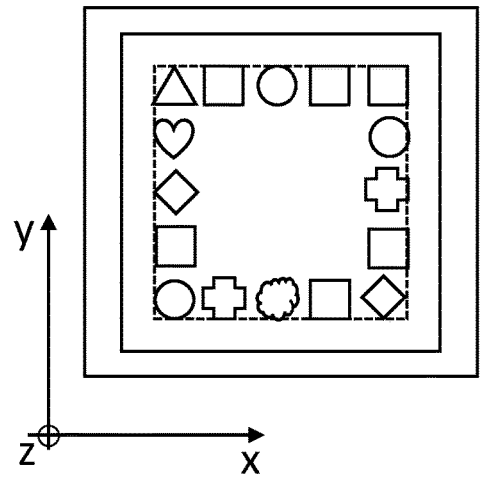
FIG. 9a shows a security element 10 at a first viewing angle.
Figure 9B:
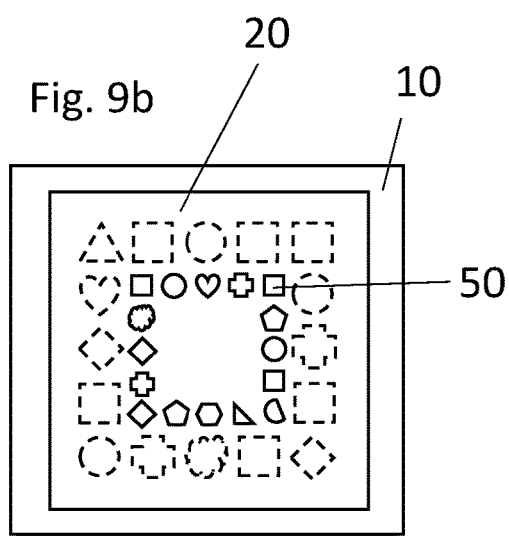
FIG. 9b shows the security element 10 in a transition from the first viewing angle to a second viewing angle.
Figure 9C:
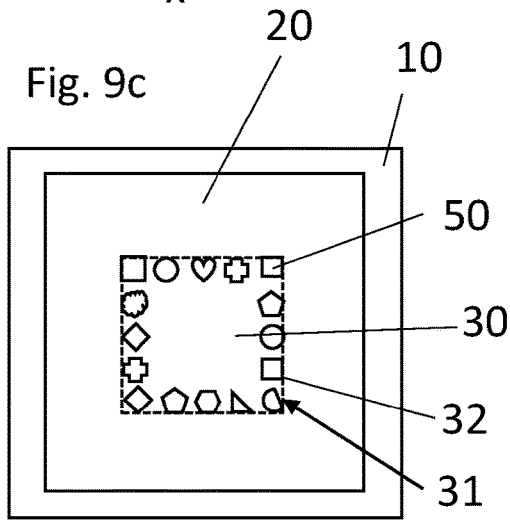
FIG. 9c shows the security element 10 at the second viewing angle.
Figure 9D:
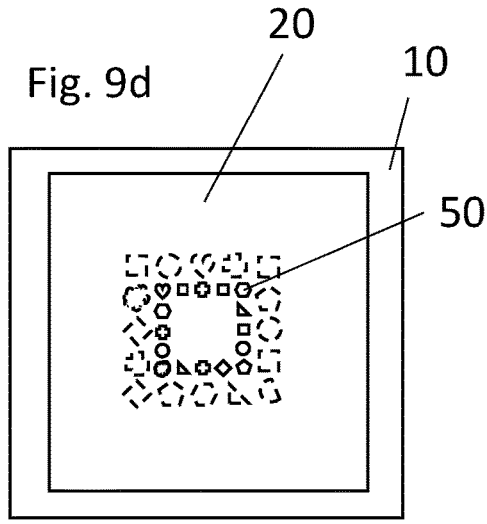
FIG. 9d shows the security element 10 in a transition from the second viewing angle to a further second viewing angle.
Figure 9E:
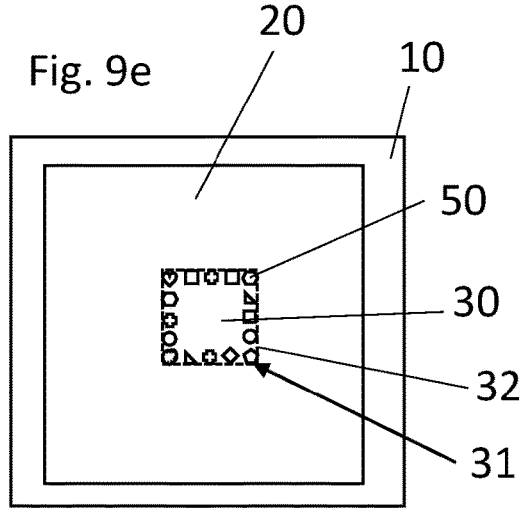
FIG. 9e shows the security element 10 at the further second viewing angle.

FIGS. 9a, 9c and 9e show a security element 10 at various viewing angles, in particular a first, a second and a further second viewing angle, respectively. The security element 10 may be any security element 10 disclosed herein.

The security element 10 comprises a motif region 20. In the motif region 20, a main motif 30 having a main motif shape 31 is visible to a viewer. The main motif 30 may comprise a contour 32. The main motif 30 comprises the submotifs 50, and in particular is represented with the aid of the submotifs 50.

FIG. 9a shows the security element 10 at the first viewing angle.

A main motif 30 may be visible in the motif region 20 of the security element 10. In this example, the main motif shape 31 is a square.

Some of the submotifs 50 have a submotif shape 51 which is different to the main motif shape 51.

A first fraction of the submotifs 50 may have a submotif shape 51 which corresponds to the main motif shape 31, and a second fraction of the submotifs 50 may have a submotif shape 51 which is different to the main motif shape 51.

The first fraction of the submotifs 50 may be (numerically) greater than the second fraction of the submotifs.

Each of the submotifs 50 may have a submotif shape 51 which is different to the main motif shape 31.

The main motif 30 may be delimited from the surroundings of the main motif 30 by a contour 32.

The main motif may comprise submotifs 50. The submotifs 50 may be visible along the contour 32.

The security element 10 may define an x-y plane having an x axis (x direction) and a y axis (y direction). A transition from the first viewing angle to a second or further second viewing angle may take place as described with reference to FIGS. 8a to 8e. In particular, the security element is tilted along an axis in the plane, here the x axis.

FIG. 9b shows the same security element 10 as in FIG. 9a. In FIG. 9b, a transition from the first viewing angle to a second viewing angle, for example a second viewing angle, is indicated. The security element 10 at the second viewing angle is shown in FIG. 9c.

At the second viewing angle, the position of the submotifs 50 may vary. For example, the submotifs 50 may be visible in a section of the motif region 20 which is enclosed by the contour 32 of the main motif at the first viewing angle.

This is indicated in FIG. 9b by submotifs 50 with a dashed contour. The submotifs 50 with a dashed contour show the submotifs 50 at the first viewing angle, and the submotifs 50 with a continuous contour show the submotifs 50 at the second viewing angle. The submotifs 50 of the two viewing angles do not overlap one another. In the example of FIG. 9b, the (outer) contour 32 of the main motif at the second viewing angle lies within the inner contour of the main motif at the first viewing angle.

At the second viewing angle, the number of submotifs 50 may remain the same. For example, the number of visible submotifs 50 at the second viewing angle may be equal to the number of submotifs 50 at the first viewing angle.

At the second viewing angle, the size or alternatively or in addition the area of the submotifs 50 may vary. For example, the size or area of visible submotifs 50 at the second viewing angle may be less than the size or area of the visible submotifs 50 at the first viewing angle.

In FIG. 9c, the main motif 30 at the second viewing angle may be seen. The area of the main motif 30 may be less at the second viewing angle than at the first viewing angle. The area of the main motif 30 which is enclosed by the contour 32 may be less at the second viewing angle than at the first viewing angle.

The main motif shape 31 of the main motif 30 at the second viewing angle may correspond to the main motif shape 31 of the main motif 30 at the first viewing angle.

The respective submotif shape 51 of each of the submotifs 50 at the first viewing angle may be different to the respective submotif shape 51 of each of the submotifs 50 at the second viewing angle.

The respective submotif shape 51 of each of the submotifs 50 at the first viewing angle and at the second viewing angle may correspond to one another.

The respective submotif shape 51 of each of the submotifs 50 at the first viewing angle and at the second viewing angle may be identical.

Both at the first viewing angle and at the second viewing angle, the main motif shape 31 of the main motif 30 may respectively be a square. Here, the squares respectively have a different area. By enlarging the main motif 30 at the second viewing angle, it may be aligned with the main motif 30 at the first viewing angle.

FIG. 9d shows a transition of the main motif 30 from the second viewing angle to a further second viewing angle. In a similar way to the representation in FIGS. 9b and 9c, submotifs 50 with a dashed contour indicate submotifs 50 at the second viewing angle and submotifs 50 with a continuous contour indicate submotifs 50 at the further second viewing angle.

A transition from the second viewing angle to the further second viewing angle is performed by further tilting the security element 10 or a document of value 100 having the security element 10 about the same axis, i.e. here the x axis (north-south tilting).

At the further second viewing angle, the position of the submotifs 50 will have changed further. For example, the submotifs 50 may be visible in a section of the motif region 20 which is enclosed by the contour 32 of the main motif at the second viewing angle.

FIG. 9d shows that the submotifs 50 of the further second viewing angle are visible in a section of the motif region 20 which is enclosed by the inner contour 32 of the main motif at the second viewing angle.

At the further second viewing angle, the number of submotifs 50 may remain the same. For example, the number of visible submotifs 50 at the further second viewing angle may be equal to the number of submotifs 50 at the second viewing angle.

At the further second viewing angle, the size or area of the submotifs 50 may vary. For example, the size or area of visible submotifs 50 at the further second viewing angle may be less than the size or area of the visible submotifs 50 at the second viewing angle.

In FIG. 9e, the main motif 30 at the further second viewing angle may be seen. The area of the main motif 30 may be less at the further second viewing angle than at the second viewing angle. The area of the main motif 30 which is enclosed by the contour 32 may be less at the further second viewing angle than at the second viewing angle.

The main motif shape 31 of the main motif 30 at the further second viewing angle may correspond to the main motif shape 31 of the main motif 30 at the second viewing angle.

The respective submotif shape 51 of each of the submotifs 50 at the second viewing angle may be different to the respective submotif shape 51 of each of the submotifs 50 at the further second viewing angle.

The respective submotif shape 51 of each of the submotifs 50 at the second viewing angle and at the further second viewing angle may correspond to one another.

The respective submotif shape 51 of each of the submotifs 50 at the second viewing angle and at the further second viewing angle may be identical.

The movement is preferably a reduction or enlargement of the main motif. A movement of the main motif 30 may, as explained above, act continuously for the viewer between the various viewing angles. Likewise, the submotifs 50 may again either be arranged statically or move. A profile or a position change of a submotif 50 or each of the submotifs 50 between various viewing angles may act continuously for the viewer.

Figure 10:
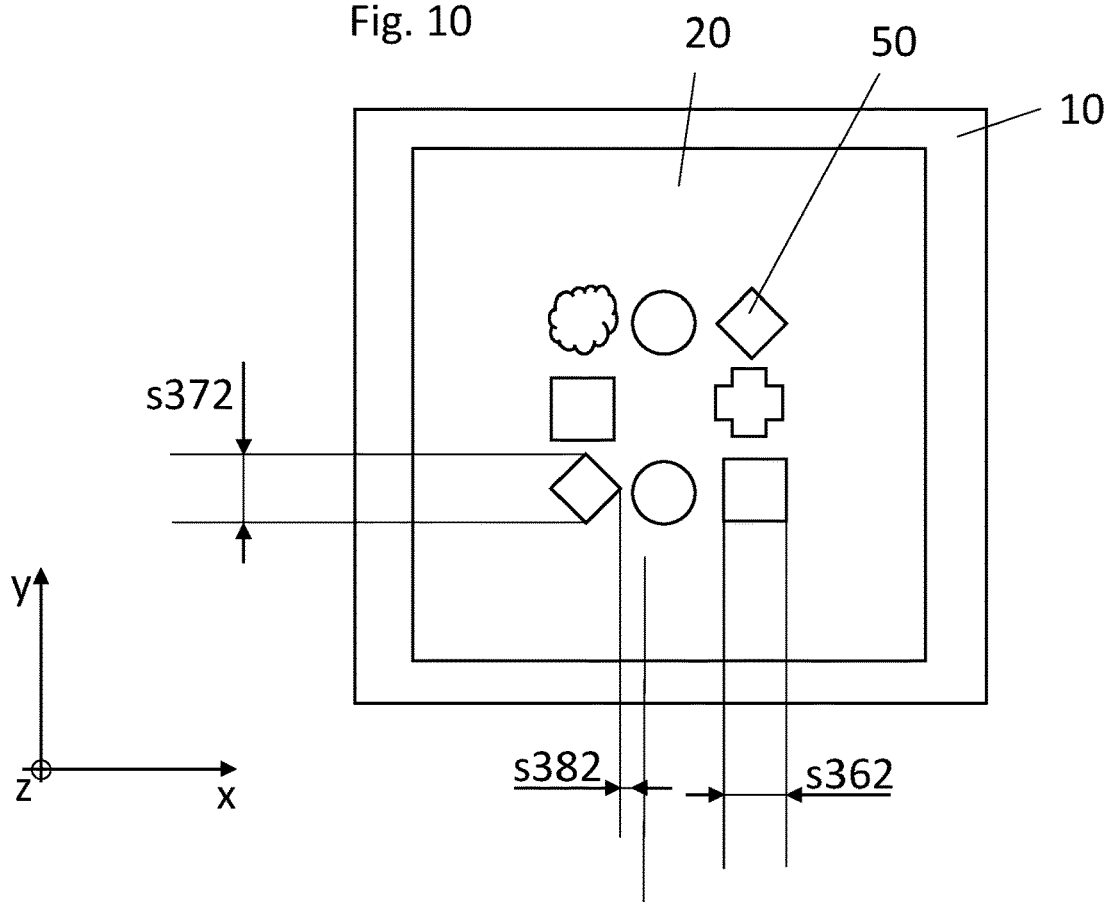
FIG. 10 shows a security element 10 having dimensions s362, s372 and s382.
Figure 11:
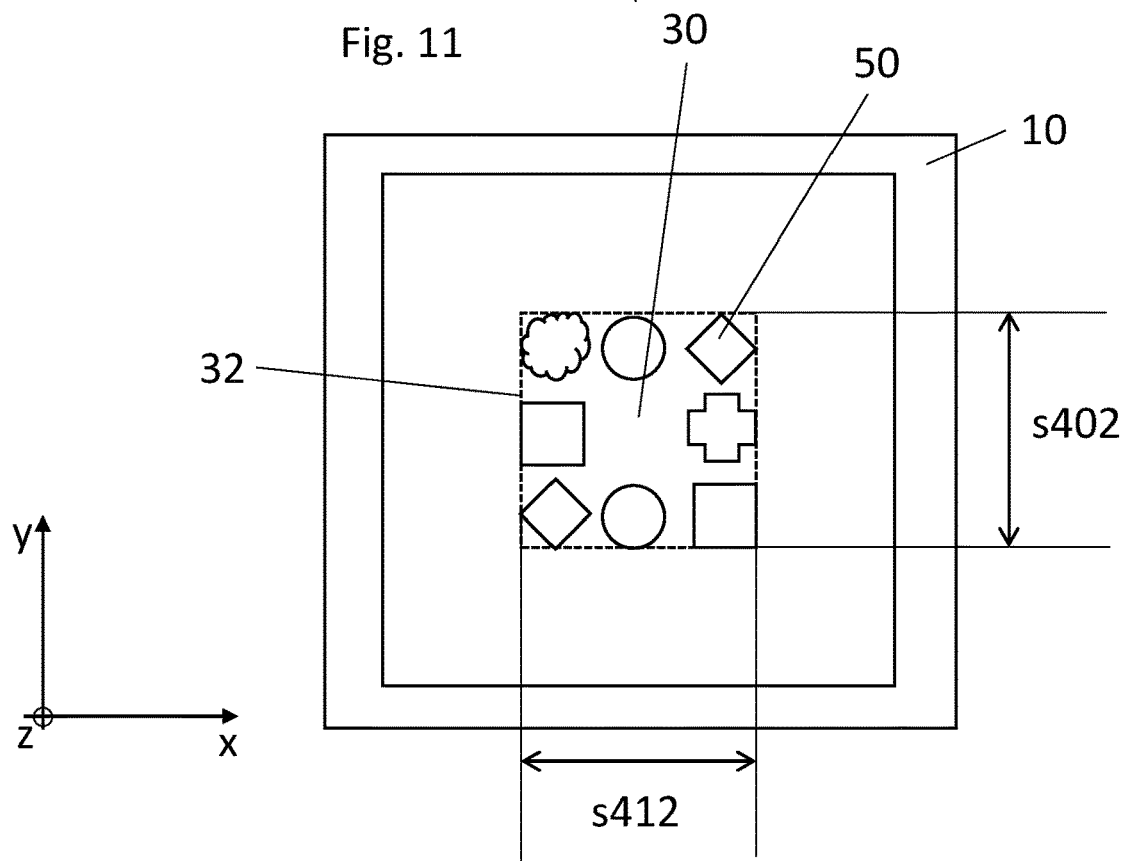
FIG. 11 shows a security element 10 having dimensions s402 and s412.

FIGS. 10 and 11 show by way of example a security element 10 at a further viewing angle, for example a second viewing angle. The security element 10 may be any security element 10 disclosed herein. The further viewing angle may be different to the first viewing angle.

The security element 10 has a motif region 20 with a main motif 30 and submotifs 50.

A submotif 50 at the further viewing angle may have a width s362. The width s362 may be visible in the x direction (in the direction of the x axis). The width s362 may be the maximum visible extent of the submotif 50 in the x direction.

The submotif 50 at the further viewing angle may have a height s372. The height s372 may be visible in the y direction (in the direction of the y axis). The height s372 may be the maximum visible extent of the submotif 50 in the y direction.

The width s362 of a submotif 50 at the further viewing angle may be equal to the width s361 of the submotif 50 at the first viewing angle.

The width s362 of a submotif 50 at the further viewing angle may be less than the width s361 of the submotif 50 at the first viewing angle.

The width s362 of a submotif 50 at the further viewing angle may be greater than the width s361 of the submotif 50 at the first viewing angle.

The height s372 of a submotif 50 at the further viewing angle may be equal to the height s371 of the submotif 50 at the first viewing angle.

The height s372 of a submotif 50 at the further viewing angle may be less than the height s371 of the submotif 50 at the first viewing angle.

The height s372 of a submotif 50 at the further viewing angle may be greater than the height s371 of the submotif 50 at the first viewing angle.

There may be a spacing s382 between two neighboring submotifs 50. The spacing s381 may exist between each of the submotifs 50.

The spacing s381 between two neighboring submotifs 50 at the further viewing angle may be the same as the spacing s381 between two neighboring submotifs 50 at the first viewing angle.

The spacing s382 between two neighboring submotifs 50 at the further viewing angle may be less than the spacing s381 between two neighboring submotifs 50 at the first viewing angle.

The spacing s382 between two neighboring submotifs 50 at the further viewing angle may be greater than the spacing s382 between two neighboring submotifs 50 at the first viewing angle.

The main motif 30 may have a width s412 at the further viewing angle. The width may be visible in the x direction (in the direction of the x axis). The width may be the maximum visible extent of the main motif 30 in the x direction. The main motif 30 may be delimited in the x direction by the contour 32 of the main motif 30.

The main motif 30 may have a height s402 at the further viewing angle. The height may be visible in the y direction (in the direction of the y axis). The height may be the maximum visible extent of the main motif 30 in the y direction. The main motif 30 may be delimited in the y direction by the contour 32 of the main motif 30.

The width s412 at the further viewing angle may be less than the width s411 at the first viewing angle.

The height s402 at the further viewing angle may be less than the height s401 at the first viewing angle.

A ratio between the width s412 and the height s402 at the further viewing angle may be substantially (±10%) equal to a ratio between the width s411 and the height s401 at the first viewing angle.

A ratio between the width s362 and the height s372 of a submotif 50 at the further viewing angle may be substantially (±10%) equal to a ratio between the width s361 and the height s371 of a submotif 50 at the first viewing angle.

Figure 12A:
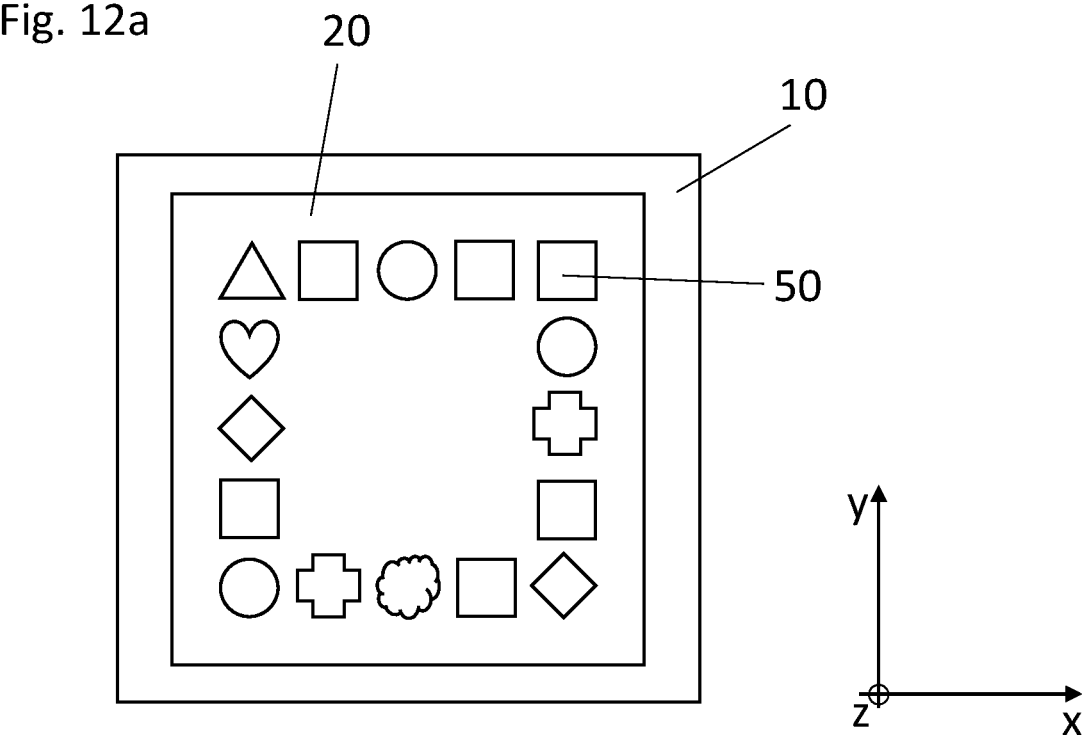
FIG. 12a shows a security element 10 having submotifs 50.

FIG. 12a shows a security element 10 having a motif region 20 and submotifs 50. The security element 10 may be any security element 10 disclosed herein.

Figure 12B:
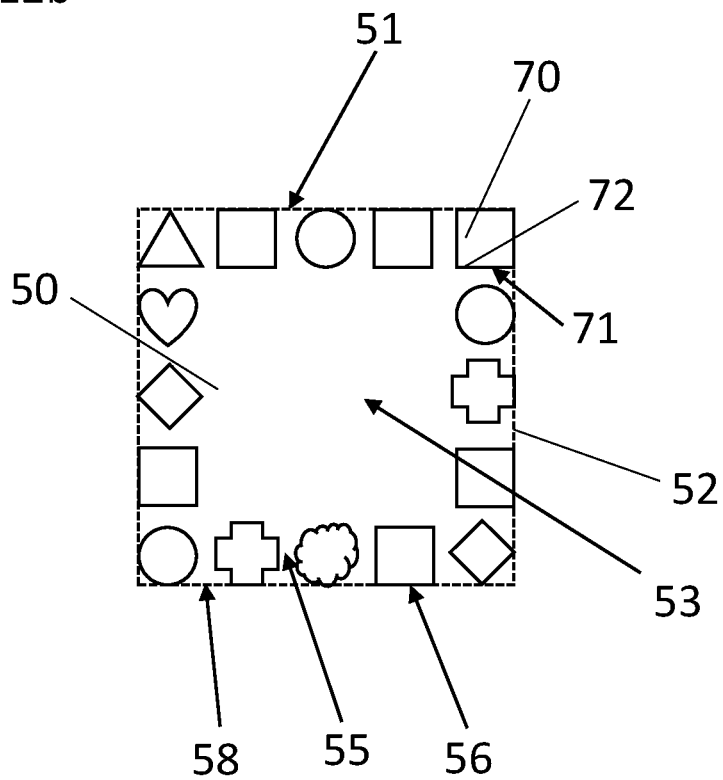
FIG. 12b shows an enlarged submotif 50 having sub-submotifs 70.

FIG. 12b shows an enlarged submotif 50 of the security element 10 as shown for example in FIG. 12a.

A submotif 50, in particular each of the submotifs 50, may have a submotif shape 51. The respective submotif shape 51 of each of the submotifs 50 may be different to the main motif shape 31 of the main motif 30. The submotif shape 51 of at least one of the submotifs 50 may be different to the main motif shape 31 of the main motif 30. The submotif shape 51 of at least one of the submotifs 50 may correspond to the main motif shape 31 of the main motif 30.

A submotif 50, in particular each of the submotifs 50, may have a contour 52. The contour 52 of the submotif 50 may include or enclose an inner section 53 of the submotif 30.

The submotif shape 51 may be established by the contour 52 of the submotif 50. The contour 52 of the submotif 50 may (fully) include or enclose an area.

Sub-submotifs 70 may be visible along the contour 52 of the submotif 50. The contour 52 of the submotif 50 may be formed by the sub-submotifs 70.

The sub-submotifs 70 may have a sub-submotif shape 71. The sub-submotif shape 71 may correspond to the main motif shape 31 and/or the submotif shape 51.

In contrast to the main and submotif, sub-submotifs are only optionally large enough to be visible as a motif for the viewer. In some configurations, the viewer may only identify a sub-submotif as a motif after enlargement, for example with a magnifying glass or a camera.

The contour 52 of the submotif 50 may be perceptible as a continuous line. For example, the contour 52 of the submotif 50 may be a continuously brightly visible section of the submotif 50.

The contour 52 of the submotif 50 may be perceptible to a viewer as an interrupted or discontinuous line. For example, the contour 52 of the submotif 50 may have alternately brightly perceptible sections 56 and darkly perceptible sections 58. In this case, a brightly perceptible section 56 may follow a darkly perceptible section 58, which is in turn followed by a brightly perceptible section 56, etc.

A brightly perceptible section 56 of the contour 52 of the submotif 50 may be established by a sub-submotif 70.

Brightly perceptible sections 56 of the contour 52 of the submotif 50 may be sections of contours 72 of the sub-submotifs 70.

The sub-submotifs 70 may be visible along the contour 52 of the submotif 50. The contour 52 of the submotif 50 may (fully) surround the sub-submotifs 70.

The sub-submotifs 70 may be (fully) visible in an inner section 53 of the submotif 50. The inner section 53 of the submotif 50 may be (fully) enclosed by the contour 52 of the submotif 50.

The sub-submotifs 70 may be visible spaced apart from one another in the motif region 20. There may be a gap 55 between two neighboring sub-submotifs 50.

The sub-submotifs 70 may be visible spaced apart constantly from one another in the motif region 20. For all sub-submotifs 70 in the motif region 20, an identical gap 55 may be visible between two neighboring sub-submotifs 70.

A gap 55 between two sub-submotifs 70 may cause a darkly perceptible section 58 of the contour 52 of the submotif 50. A darkly perceptible section 58 of the contour 52 of the submotif 50 may be an absence of a contour 72 of a sub-submotif 70.

Brightly perceptible sections 56 and darkly perceptible sections 58 of the contour 52 of the submotif 50 may have a different longitudinal extent.

For example, brightly perceptible sections 56 may have a greater longitudinal extent than darkly perceptible sections 58.

Likewise, darkly perceptible sections 58 may have a greater longitudinal extent than brightly perceptible sections 56.

Brightly perceptible sections 56 and darkly perceptible sections 58 may have an identical longitudinal extent.

At least 10%, preferably at least 25%, more preferably at least 40%, more preferably at least 55%, more preferably at least 70%, more preferably at least 85%, more preferably at least 90% of the darkly perceptible sections 58 of the contour 52 of the submotif 50 may have the same longitudinal extent.

At least 10%, preferably at least 25%, more preferably at least 40%, more preferably at least 55%, more preferably at least 70%, more preferably at least 85%, more preferably at least 90% of the brightly perceptible sections 56 of the contour 52 of the submotif 50 may have the same longitudinal extent.

The contour 52 of the submotif 50 may be brightly perceptible to at least 10%, preferably to at least 25%, more preferably to at least 40%, more preferably to at least 55%, more preferably to at least 70%, more preferably to at least 85%, more preferably to at least 90% (of its total length).

The contour 52 of the submotif 50 may be darkly perceptible to at least 10%, preferably to at least 25%, more preferably to at least 40%, more preferably to at least 55%, more preferably to at least 70%, more preferably to at least 85%, more preferably to at least 90% (of its total length).

The inner section 53 of the submotif 50, which is enclosed by the contour 52, may be darkly perceptible to at least 25%, preferably to at least 50%, more preferably to at least 60%, more preferably to at least 70%, more preferably to at least 80%, more preferably to at least 90%.

The sub-submotifs 70 may have the same properties as the submotifs 50 and/or the main motif 30.

Figure 13A:
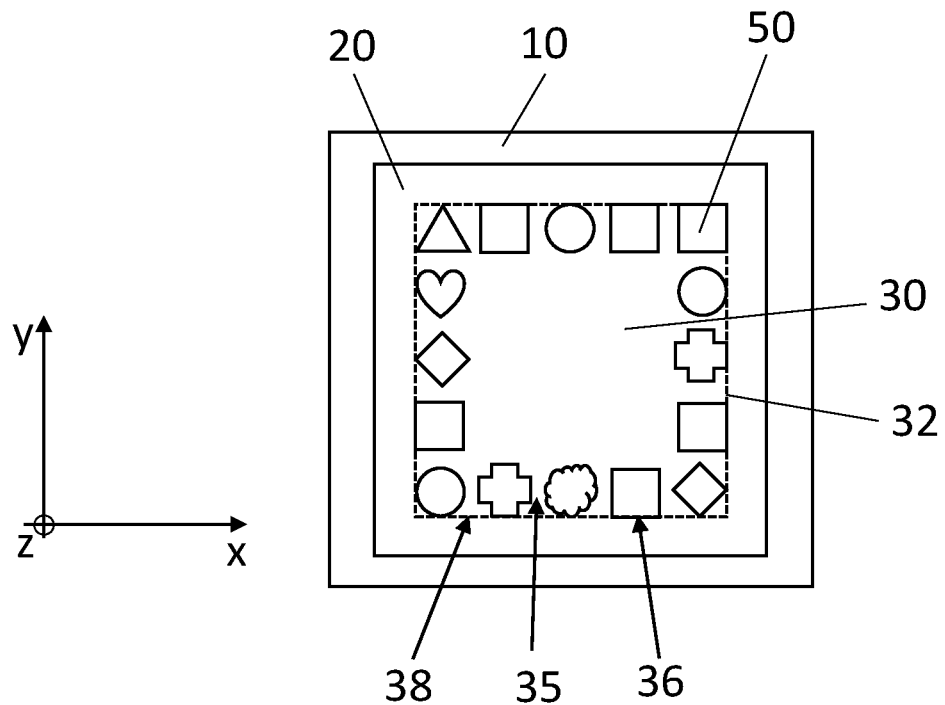
FIG. 13a shows a security element 10 having submotifs 50 at a viewing angle.
Figure 13B:
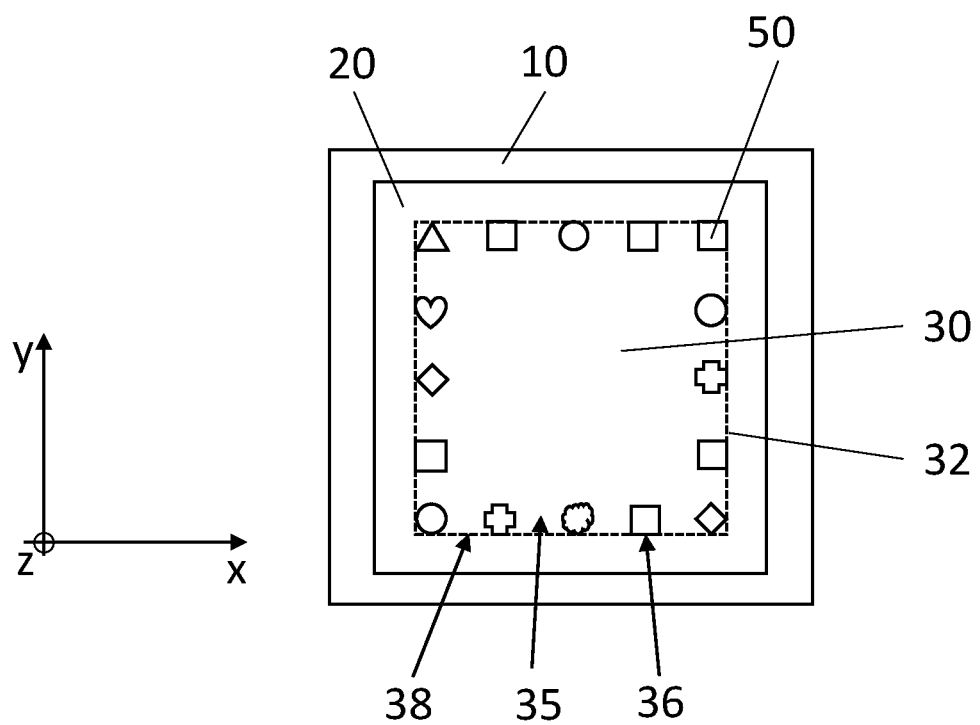
FIG. 13b shows the security element 10 having submotifs 50 at a further viewing angle.

FIG. 13a shows a security element 10 at a third viewing angle, which may in particular be any of the first, second or further second viewing angles, and FIG. 13b shows the security element 10 at a fourth viewing angle. The security element 10 may be any security element 10 disclosed herein.

A transition from the third viewing angle to the fourth (or further fourth) viewing angle may be performed by tilting the security element 10 or a document of value 100 having the security element 10 about a further axis in the x-y plane, in particular the y axis (east-west tilting). In this case, a position of a light source and of a viewer should not change.

By a transition from the third viewing angle to the fourth viewing angle, the position, size, area and/or shape of the submotifs 50 may change.

By a transition from the third viewing angle to the fourth viewing angle, the position of the submotifs 50 may change. Alternatively or in addition, the size of the submotifs 50 may change by a transition from the third viewing angle to the fourth viewing angle. Alternatively or in addition, the area of the submotifs 50 may change by a transition from the third viewing angle to the fourth viewing angle. Alternatively or in addition, the shape of the submotifs 50 may change by a transition from the third viewing angle to the fourth viewing angle.

By a transition from the third viewing angle to the fourth viewing angle, the position of the main motif 30 may change. Alternatively or in addition, the size of the main motif 30 may change by a transition from the third viewing angle to the fourth viewing angle. Alternatively or in addition, the area of the main motif 30 may change by a transition from the third viewing angle to the fourth viewing angle. Alternatively or in addition, the shape of the main motif 30 may change by a transition from the third viewing angle to the fourth viewing angle.

Preferably, however, the main motif 30 remains substantially unchanged during tilting about the second axis. The tilting about the second axis preferably changes only the submotifs 50 which represent the main motif 50. The main motif 30 may in particular be varied by tilting about the first axis, as described above, starting from the third (or each third) viewing angle.

The contour 32 of the main motif 30 may be perceptible as a continuous line. For example, the contour 32 of the main motif 30 may be a continuously brightly visible section of the main motif.

The contour 32 of the main motif 30 may be perceptible to a viewer as an interrupted or discontinuous line. For example, the contour 32 of the main motif 30 may have alternately brightly perceptible sections 36 and darkly perceptible sections 38.

The fraction of darkly perceptible sections 38 in the contour 32 at the third viewing angle may be equal to the fraction of darkly perceptible sections 38 in the contour 32 at the fourth viewing angle.

The fraction of darkly perceptible sections 38 in the contour 32 at the third viewing angle may be greater than the fraction of darkly perceptible sections 38 in the contour 32 at the fourth viewing angle.

The fraction of darkly perceptible sections 38 in the contour 32 at the third viewing angle may be less than the fraction of darkly perceptible sections 38 in the contour 32 at the fourth viewing angle.

The fraction of brightly perceptible sections 36 in the contour 32 at the third viewing angle may be equal to the fraction of brightly perceptible sections 36 in the contour 32 at the fourth viewing angle.

The fraction of brightly perceptible sections 36 in the contour 32 at the third viewing angle may be greater than the fraction of brightly perceptible sections 36 in the contour 32 at the fourth viewing angle.

The fraction of brightly perceptible sections 36 in the contour 32 at the third viewing angle may be less than the fraction of brightly perceptible sections 36 in the contour 32 at the fourth viewing angle.

The submotifs 50 may be visible spaced apart from one another in the motif region 20. There may be a gap 35 between two neighboring submotifs 50.

The longitudinal extent of a gap 35 between two neighboring submotifs 50 at the third viewing angle may be equal to the longitudinal extent of the gap between the neighboring submotifs at the fourth viewing angle.

The longitudinal extent of a gap 35 between two neighboring submotifs 50 at the third viewing angle may be less than the longitudinal extent of the gap between the neighboring submotifs at the fourth viewing angle.

The longitudinal extent of a gap 35 between two neighboring submotifs 50 at the third viewing angle may be greater than the longitudinal extent of the gap between the neighboring submotifs at the fourth viewing angle.

The submotif shape 51 of the submotifs 50 at the third viewing angle may correspond to the submotif shape 51 of the submotifs 50 at the fourth viewing angle.

The main motif shape 31 of the main motif 30 at the third viewing angle may correspond to the main motif shape 31 of the main motif 30 at the fourth viewing angle.

Figure 13C:
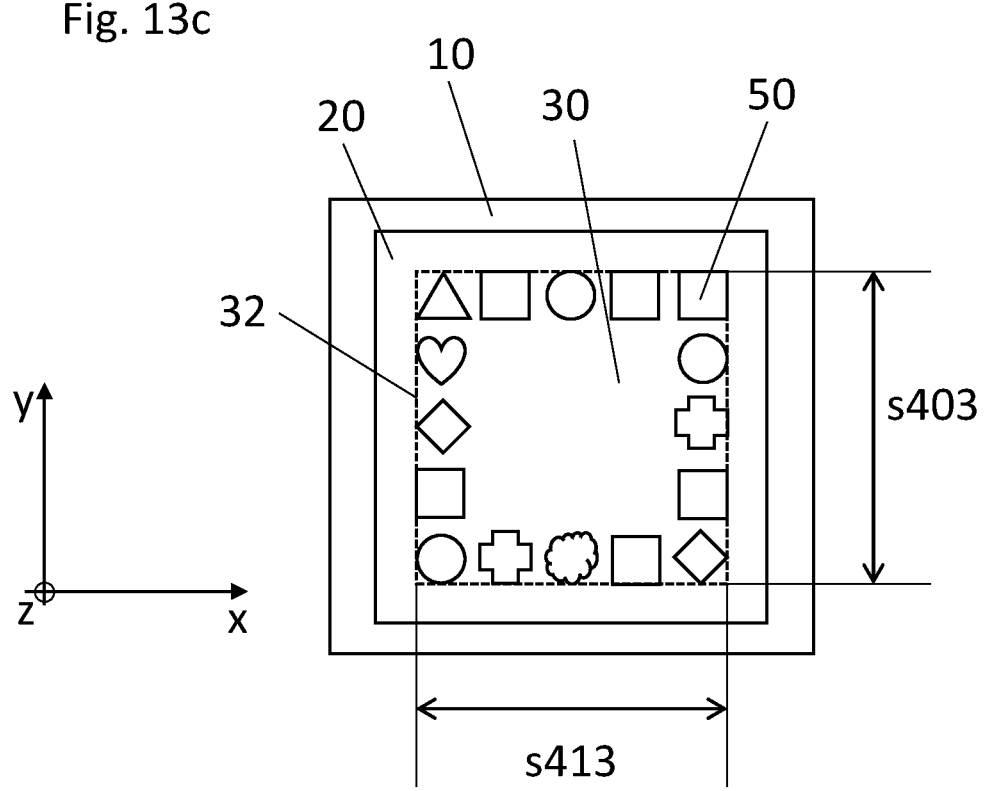
FIG. 13c shows the security element 10 having submotifs 50 at the viewing angle with dimensions s403 and s413.
Figure 13D:
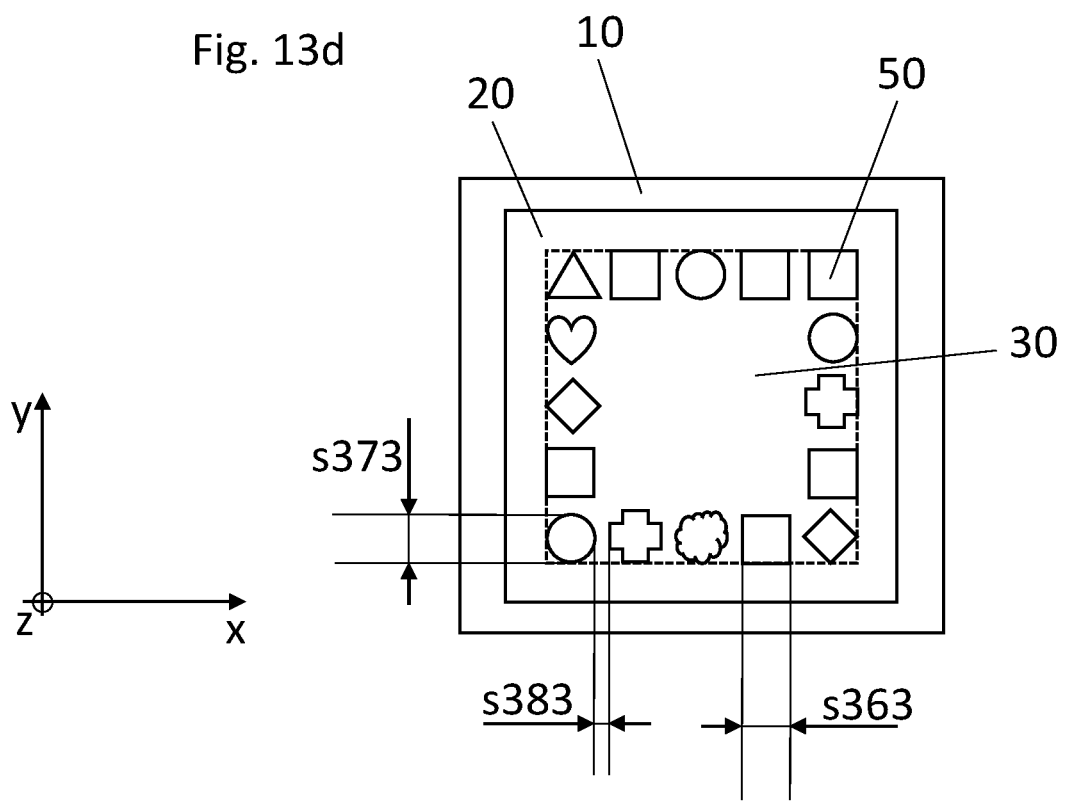
FIG. 13d shows the security element 10 having submotifs 50 at the viewing angle with dimensions s363, s373 and s383.
Figure 13E:
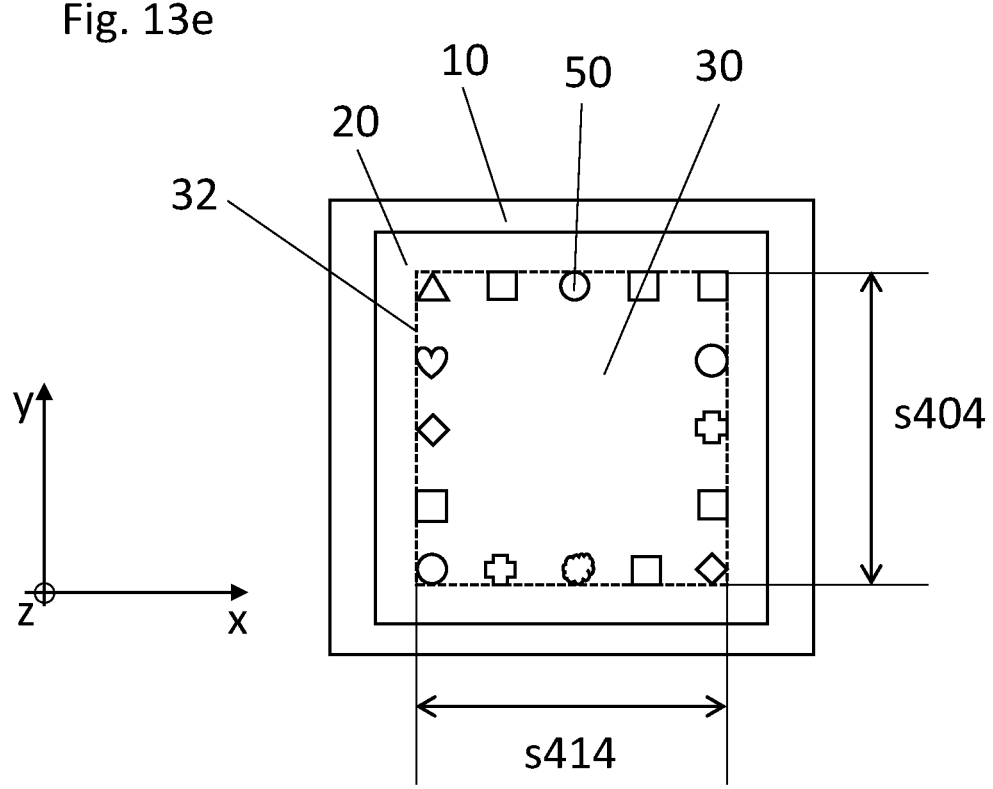
FIG. 13e shows the security element 10 having submotifs 50 at the further viewing angle with dimensions s404 and s414.

FIG. 13c shows a security element 10 at the third viewing angle and FIG. 13e shows the security element 10 at the fourth viewing angle.

The main motif 30 may have a width s413 at the third viewing angle. The main motif 30 may have a width s414 at the fourth viewing angle. The width may be visible in the x direction (in the direction of the x axis). The width may be the maximum visible extent of the main motif 30 in the x direction. The main motif 30 may be delimited in the x direction by the contour 32 of the main motif 30.

The main motif 30 may have a height s403 at the third viewing angle. The main motif 30 may have a height s404 at the fourth viewing angle. The height may be visible in the y direction (in the direction of the y axis). The height may be the maximum visible extent of the main motif 30 in the y direction. The main motif 30 may be delimited in the y direction by the contour 32 of the main motif 30.

The width s413 of the main motif 30 at the third viewing angle may be equal to the width s414 of the main motif 30 at the fourth viewing angle.

The width s413 of the main motif 30 at the third viewing angle may be less than the width s414 of the main motif 30 at the fourth viewing angle.

The width s413 of the main motif 30 at the third viewing angle may be greater than the width s414 of the main motif 30 at the fourth viewing angle.

The height s403 of the main motif 30 at the third viewing angle may be equal to the height s404 of the main motif 30 at the fourth viewing angle.

The height s403 of the main motif 30 at the third viewing angle may be less than the height s404 of the main motif 30 at the fourth viewing angle.

The height s403 of the main motif 30 at the third viewing angle may be greater than the height s404 of the main motif 30 at the fourth viewing angle.

A ratio between the width s413 and the height s403 at the third viewing angle may be substantially (±10%) equal to a ratio between the width s414 and the height s404 at the fourth viewing angle.

Figure 13F:
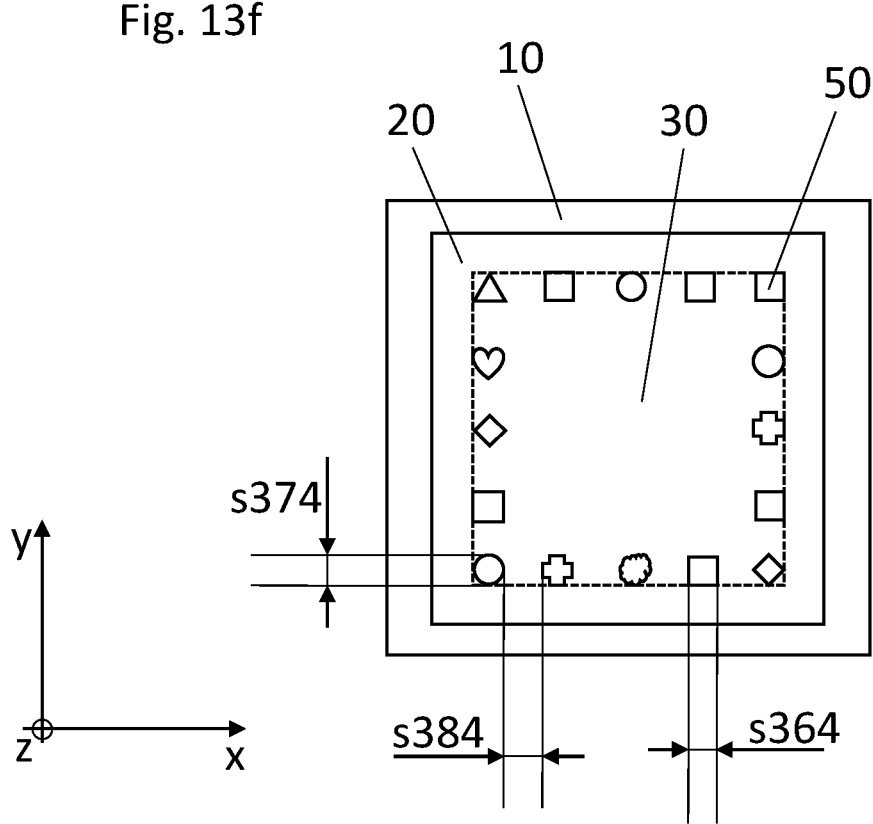
FIG. 13f shows the security element 10 having submotifs 50 at the further viewing angle with dimensions s364, s374 and s384.

FIG. 13d shows a security element 10 at the third viewing angle and FIG. 13f shows the security element 10 at the fourth viewing angle.

A submotif 50 at the third viewing angle may have a width s363. A submotif 50 at the fourth viewing angle may have a width s364. The width may be visible in the x direction (in the direction of the x axis). The width may be the maximum visible extent of the submotif 50 in the x direction.

The submotif 50 at the third viewing angle may have a height s373. The submotif 50 at the fourth viewing angle may have a height s374. The height may be visible in the y direction (in the direction of the y axis). The height may be the maximum visible extent of the submotif 50 in the y direction.

The width s363 of a submotif 50 at the third viewing angle may be equal to the width s364 of the submotif 50 at the fourth viewing angle.

The width s363 of a submotif 50 at the third viewing angle may be less than the width s364 of the submotif 50 at the fourth viewing angle.

The width s363 of a submotif 50 at the third viewing angle may be greater than the width s364 of the submotif 50 at the fourth viewing angle.

The height s373 of a submotif 50 at the third viewing angle may be equal to the height s374 of the submotif 50 at the fourth viewing angle.

The height s373 of a submotif 50 at the third viewing angle may be less than the height s374 of the submotif 50 at the fourth viewing angle.

The height s373 of a submotif 50 at the third viewing angle may be greater than the height s374 of the submotif 50 at the fourth viewing angle.

There may be a spacing s383 between two neighboring submotifs 50 at the third viewing angle. There may be a spacing s384 between two neighboring submotifs 50 at the fourth viewing angle. The spacing may exist between each of the submotifs 50.

The spacing s383 between two neighboring submotifs 50 at the third viewing angle may be equal to the spacing s384 between two neighboring submotifs 50 at the fourth viewing angle.

The spacing s383 between two neighboring submotifs 50 at the third viewing angle may be less than the spacing s384 between two neighboring submotifs 50 at the fourth viewing angle.

The spacing s383 between two neighboring submotifs 50 at the third viewing angle may be greater than the spacing s384 between two neighboring submotifs 50 at the fourth viewing angle.

A ratio between the width s363 and the height s373 of a submotif 50 at the third viewing angle may be substantially (±10%) equal to a ratio between the width s364 and the height s374 of a submotif 50 at the fourth viewing angle.

In general, a spacing may be the shortest distance between objects (for example between two submotifs) in a direction, preferably in the x direction or in the y direction.

Less or smaller may mean at least 100 µm less or at least 100 µm smaller. Less or smaller may mean between 100 µm and 500 µm less or between 100 µm and 500 µm smaller.

Greater may mean at least 100 µm greater. Greater may mean between 100 µm and 500 µm greater.

Equal may mean a deviation of at most ±10%, preferably at most ±5%, more preferably ±3%, more preferably ±1%.

In general, each of the submotifs 50 of a main motif 30 may have the features which are disclosed with reference to a submotif 50. Each of the sub-submotifs 70 of a main motif 30 or of a submotif 50 may have substantially the features which are disclosed with reference to a sub-submotif 70.

The invention claimed is:

1. An optically variable security element having a motif region, wherein:
   an optically variable main motif having a contour in the motif region is visible to a viewer at least at a first viewing angle, and
   the optically variable main motif comprises substructures that are visible to the viewer, the visible substructures being visible along the contour of the main motif, wherein
   the substructures are submotifs that are visible to the viewer, and
   each of the submotifs has a submotif contour;
   wherein peripheral sections of each submotif having a maximum distance away from an inner section of the main motif form the contour of the main motif;
   wherein the main motif is visible differently as a function of the viewing angle, and at at least one second viewing angle that is different from the first viewing angle the optically variable main motif is visible with a smaller or greater area, at a different position and/or with a different degree of rotation than at the first viewing angle.

2. The optically variable security element according to claim 1, wherein the contour of the main motif encloses the inner section of the main motif, and/or
   wherein the submotif contour of each of the submotifs encloses an inner section of each of the submotifs.

3. The optically variable security element according to claim 1, wherein the main motif has a main motif shape and each of the submotifs has a submotif shape, the submotif shape of at least one of the submotifs being different from the main motif shape of the main motif.

4. The optically variable security element according to claim 3, wherein at least two of the submotifs have a different submotif shape to one another or
   wherein the submotifs have an identical submotif shape.

5. The optically variable security element according to claim 1, wherein the main motif is represented only by its contour and/or each submotif is respectively represented only by its submotif contour.

6. The optically variable security element according to claim 1, wherein the submotifs comprise sub-submotifs, which are arranged along the submotif contour of the respective submotif.

7. The optically variable security element according to claim 6, wherein the sub-submotifs have a sub-submotif shape and the sub-submotif shape of at least one of the sub-submotifs is different from a main motif shape of the main motif and/or different from a submotif shape of at least one of the submotifs.

8. The optically variable security element according to claim 1, wherein the submotifs form at least 10% of a total length of the contour of the main motif.

9. The optically variable security element according to claim 1, wherein a spacing is respectively visible between two neighboring submotifs, wherein the spacings between the submotifs form less than 70% of a total length of the contour of the main motif.

10. The optically variable security element according to claim 1, wherein the contour of the main motif is visible to the viewer by alternately bright and dark sections.

11. The optically variable security element according to claim 1, wherein the optically variable main motif comprises submotifs that are visible at the second viewing angle, an area of each of the submotifs at the second viewing angle being equal to, less or greater than an area of each of the submotifs at the first viewing angle.

12. The optically variable security element according to claim 1, wherein the optically variable main motif comprises submotifs that are visible at the second viewing angle, a number of submotifs at the second viewing angle being equal to, less or greater than a number of submotifs at the first viewing angle.

13. The optically variable security element according to claim 1, wherein the optically variable security element defines an x-y plane with an x axis and a y axis, and a transition from a first viewing angle to a further viewing angle being performable by tilting the optically variable security element about the x axis.

14. The optically variable security element according to claim 13, wherein a transition from a third viewing angle to at least one fourth viewing angle is performable by tilting the optically variable security element about the y axis, the submotifs differing at the third viewing angle and the fourth viewing angle, wherein
   the main motif changes when tilting about the x axis and does not change when tilting about the y axis; and/or
   the submotifs differ at the third viewing angle and the fourth viewing angle in size and/or in a ratio of dark to bright sections, with a total area of the submotifs and/or an area of the submotifs remaining constant.

15. The optically variable security element according to claim 1, wherein the optically variable security element comprises an arrangement of directionally reflecting microreflectors which generate the main motif and the submotifs for the viewer as a function of the viewing angle, wherein
   the microreflectors are micromirrors; and/or
   the arrangement comprises a relief structure having a reflection-increasing coating, or a metal coating, an optically variable coating, an optically variable multi-layer structure, or an HRI coating; and/or
   the arrangement comprises an embossed embossing lacquer layer.

16. A document of value having an optically variable security element according to claim 1.

17. An optically variable security element having a motif region, wherein:
   an optically variable main motif having a contour in the motif region is visible to a viewer at least at a first viewing angle,
   the optically variable main motif comprises substructures that are visible to the viewer, the visible substructures being visible along the contour of the main motif,
   the substructures are submotifs that are visible to the viewer, and
   each of the submotifs has a submotif contour;
   wherein the submotifs comprise sub-submotifs, which are arranged along the submotif contour of the respective submotif.

18. The optically variable security element according to claim 17, wherein the main motif has a main motif shape and each of the submotifs has a submotif shape, the submotif shape of at least one of the submotifs being different from the main motif shape of the main motif.

19. An optically variable security element having a motif region, wherein:

an optically variable main motif having a contour in the motif region is visible to a viewer at least at a first viewing angle, the optically variable main motif comprises substructures that are visible to the viewer, the visible substructures being visible along the contour of the main motif, the substructures are submotifs that are visible to the viewer, and each of the submotifs has a submotif contour;

wherein the optically variable security element defines an x-y plane with an x axis and a y axis, and a transition from the first viewing angle to a further viewing angle being performable by tilting the optically variable security element about the x axis;

wherein a transition from a third viewing angle to at least one fourth viewing angle is performable by tilting the optically variable security element about the y axis, the submotifs differing at the third viewing angle and the fourth viewing angle, wherein the main motif changes when tilting about the x axis and does not change when tilting about the y axis; and/or the submotifs differ at the third viewing angle and the fourth viewing angle in size and/or in a ratio of dark to bright sections.

20. The optically variable security element according to claim 19, wherein the main motif has a main motif shape and each of the submotifs has a submotif shape, the submotif shape of at least one of the submotifs being different from the main motif shape of the main motif.

* * * * *